(12) United States Patent
Oh et al.

(10) Patent No.: US 8,572,310 B2
(45) Date of Patent: Oct. 29, 2013

(54) INVALIDATING STORAGE AREA OF NON-VOLATILE STORAGE MEDIUM BASED ON METADATA

(75) Inventors: Sang-Jin Oh, Suwon-si (KR); Chanik Park, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 421 days.

(21) Appl. No.: 12/955,207

(22) Filed: Nov. 29, 2010

(65) Prior Publication Data
US 2011/0072188 A1    Mar. 24, 2011

Related U.S. Application Data

(63) Continuation-in-part of application No. 12/255,759, filed on Oct. 22, 2008, now Pat. No. 8,135,901.

(30) Foreign Application Priority Data

Nov. 6, 2007   (KR) ............................... 2007-112791
Mar. 16, 2010  (KR) ........................ 10-2010-0023360

(51) Int. Cl.
*G06F 12/00*    (2006.01)

(52) U.S. Cl.
USPC .................................. 711/103; 711/E12.002

(58) Field of Classification Search
None
See application file for complete search history.

(56) References Cited

U.S. PATENT DOCUMENTS

| | | | |
|---|---|---|---|
| 5,671,388 A | 9/1997 | Hasbun | |
| 6,785,767 B2 | 8/2004 | Coulson | |
| 6,950,255 B2 | 9/2005 | Imai | |
| 2008/0034142 A1 | 2/2008 | Jo et al. | |

FOREIGN PATENT DOCUMENTS

| | | |
|---|---|---|
| JP | 2004-030534 | 1/2004 |
| JP | 2008-310459 | 12/2008 |
| KR | 1020060061933 A | 6/2006 |
| KR | 1020080013156 A | 2/2008 |

*Primary Examiner* — Kevin Verbrugge
(74) *Attorney, Agent, or Firm* — Volentine & Whitt, PLLC

(57) ABSTRACT

In one aspect, meta data corresponding to a non-volatile storage media is read from the non-volatile storage media. Meta data to be updated is detected from the read meta data. Based on the read meta data and the detected meta data to be updated, storage areas of the non-volatile storage media are invalidated.

20 Claims, 28 Drawing Sheets

Fig. 3

Structure of a Master Boot Record:

| Address | | Description | Size in bytes |
|---|---|---|---|
| Hex | Dec | | |
| 0000 | 0 | Code Area | max. 446 |
| 01B8 | 440 | Optional Disk signature | 4 |
| 01BC | 444 | Usually Nulls:0x0000 | 2 |
| 01BE | 446 | Table of primary partitions (Four 16-byte entries, IBM Partition Table scheme) | 64 |
| 01FE | 510 | 55h — MBR signature: 0xAA55 | 2 |
| 01FF | 511 | AAh | |
| MBR, total size:446+64+2 = | | | 512 |

Fig. 4

Layer of one 16-byte partition record

| Offset | Description |
|---|---|
| 0x00 | (1 byte) Status[2] (0x80=bootable, 0x00=non-bootable, other=malformed[3]) |
| 0x01 | (3 byte) Cylinder-head-sector address of the first sector in the partition[4] |
| 0x04 | (1 byte) Partition type[5] |
| 0x05 | (3 byte) Cylinder-head-sector address of the last sector in the partition[5] |
| 0x08 | (4 byte) Logical block address of the first sector in the partition |
| 0x0C | (4 byte) Length of the partition, in sectors |

Fig. 5

| Partition Type ID Value | |
|---|---|
| 0x01 | FAT12 primary partition or logical drive (fewer then 32,680 sectors in the volume) |
| 0x04 | FAT16 partition or logical drive (32,680-65,535 sectors or 16 MB-33 MB) |
| 0x05 | Extended partition |
| 0x06 | BIGDOS FAT16 partition or logical drive (33 MB-4GB) |
| 0x07 | Installable File System (NTFS partition or logical drive) |
| 0x0B | FAT32 partition or logical drive |

Fig. 9
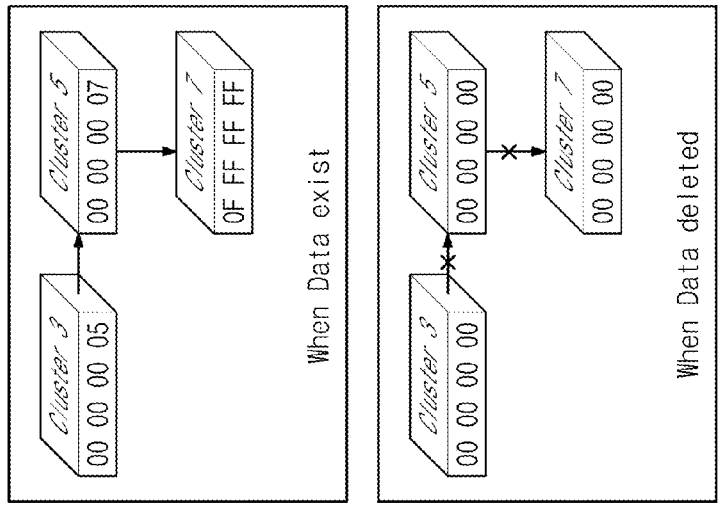
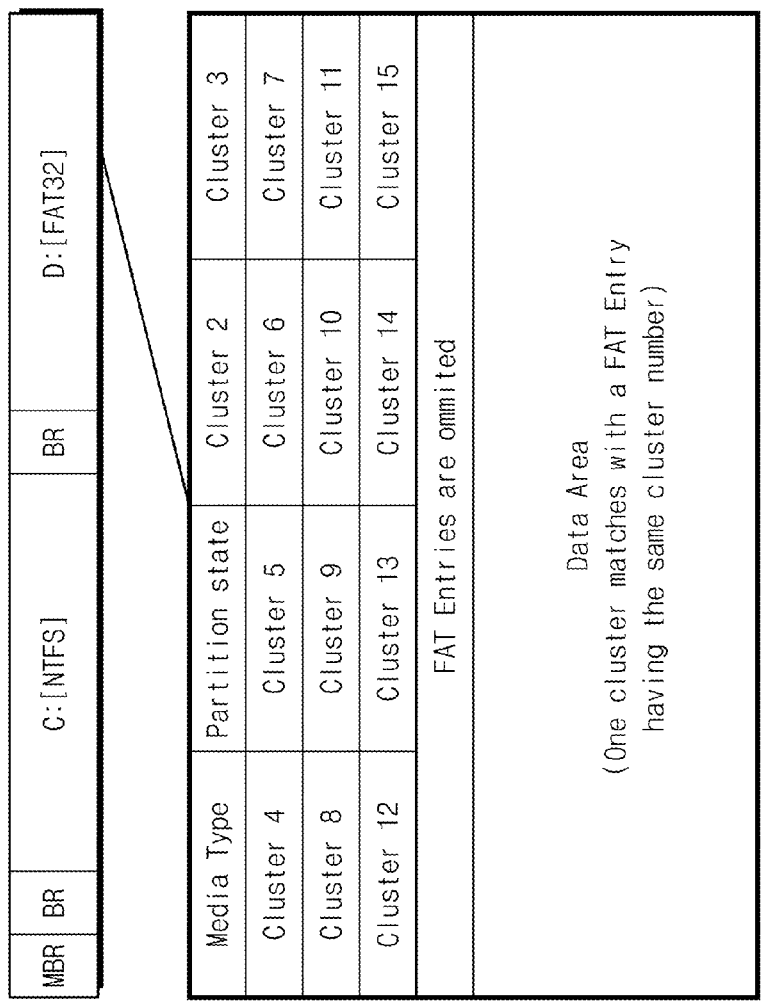

US 8,572,310 B2

INVALIDATING STORAGE AREA OF NON-VOLATILE STORAGE MEDIUM BASED ON METADATA

CROSS-REFERENCE TO RELATED APPLICATIONS

This U.S. non-provisional patent application is a continuation-in-part of U.S. patent application Ser. No. 12/255,759 filed Oct. 22, 2008, and also claims priority under 35 U.S.C. §119 from Korean Patent Application No. 2010-0023360 filed on Mar. 16, 2010, the entire contents of both of which applications are hereby incorporated by reference.

SUMMARY

The present invention generally relates to memory systems, and more particularly, the present invention relates to a memory system, a computer system which includes a memory system, and a method of operating a memory system. Examples of the memory system include a controller and a non-volatile storage media.

One example of a memory system is a solid state drive (SSD). A SSD is a data storage device that typically emulates a conventional hard disk drive (HDD), thus easily replacing the HDD in most applications. In contrast to the rotating disk medium of an HDD, an SSD utilizes solid state memory to store data. With no moving parts, an SSD largely eliminates seek time, latency and other electro-mechanical delays and failures associated with a conventional HDD.

An SSD is commonly composed of either one or more NAND flash (non-volatile) memory devices or synchronous dynamic random access memory (SDRAM) (volatile) devices.

SSDs based on volatile memory, such as SDRAM, are characterized by fast data access and are used primarily to accelerate applications that would otherwise be held back by the latency of disk drives. The volatile memory of the DRAM-based SSDs typically requires the inclusion of an internal battery and a backup disk system to ensure data persistence. If power is lost, the battery maintains power for a sufficient duration to copy data from the SDRAM to the backup disk system. Upon restoration of power, data is copied back from the backup disk to SDRAM, at which time the SSD resumes normal operations.

However, at present most SSD manufacturers use non-volatile flash memory to create more rugged and compact alternatives to DRAM-based SSDs. These flash memory-based SSDs, also known as flash drives, do not require batteries, allowing makers to more easily replicate standard hard disk drives. In addition, non-volatile flash SSDs retain stored data during power loss.

According to an aspect of the inventive concepts of the present invention, a method of operating a memory system including a non-volatile storage media is provided. The method includes reading meta data corresponding to the non-volatile storage media from the non-volatile storage media, detecting meta data to be updated from the read meta data, and invalidating storage areas of the non-volatile storage media based on the read meta data and the detected meta data to be updated.

According to another aspect of the inventive concepts of the present invention, detecting the meta data to be updated from the read meta data includes detecting meta data corresponding to second storage areas of the non-volatile storage media for which a specific time period has not yet passed since the second storage areas were last accessed.

According to yet another aspect of the inventive concepts of the present invention, the specific time period corresponds to a flush time of a host processor that is operatively connected to the memory system.

According to still another aspect of the inventive concepts of the present invention, invalidating the storage areas of the non-volatile storage media includes detecting from the read meta data the storage areas which are set as invalid by the read meta data, and invalidating the detected storage areas, except for second storage areas corresponding to the detected meta data to be updated.

According to still another aspect of the inventive concepts of the present invention, invalidating the storage areas of the non-volatile storage media includes deleting the storage areas of the non-volatile storage media based on the read meta data and the detected meta data to be updated.

According to an aspect of the inventive concepts of the present invention, a memory system is provided. The memory system includes a non-volatile storage media, and a controller configured to control the non-volatile storage media. The controller is configured to read from the non-volatile storage media meta data corresponding to the non-volatile storage media, and to invalidate storage areas of the non-volatile storage media based on the read meta data and addresses received from a source external to the memory system.

According to another aspect of the inventive concepts of the present invention, the controller is further configured to delete the storage areas of the non-volatile storage media based on the read meta data and the addresses received from a source external to the memory system.

According to yet another aspect of the inventive concepts of the present invention, the controller is further configured to invalidate the storage areas of the non-volatile storage media based on the received addresses and the read meta data when the received addresses correspond to a write command.

According to still another aspect of the inventive concepts of the present invention, the controller is further configured to detect storage areas which are set as invalid by the read meta data from the read meta data, and to invalidate the detected storage areas of the non-volatile storage media, except for second storage areas corresponding to the received addresses when a specific time period have not yet passed after the addresses are received.

According to still another aspect of the inventive concepts of the present invention, the controller is further configured to detect from the read meta data the storage areas which are set as invalid by the read meta data and to invalidate the detected storage areas of the non-volatile storage media while inhibiting invalidation of second storage areas corresponding to the received addresses.

According to still another aspect of the inventive concepts of the present invention, the controller is further configured to store the received addresses into a memory, to start a count corresponding to the stored addresses, and to invalidate the storage areas of the non-volatile storage media based on the read meta data and the addresses stored in the memory.

According to still another aspect of the inventive concepts of the present invention, the controller is further configured to delete the stored addresses from the memory when the count corresponding to the stored addresses reaches a specific value.

According to still another aspect of the inventive concepts of the present invention, the controller is further configured to reset the count corresponding to the stored addresses when the addresses stored in the memory are received from the source external to the memory system.

According to still another aspect of the inventive concepts of the present invention, the controller is further configured to read from the non-volatile storage media bitmap data of the meta data stored in the non-volatile storage media and to invalidate the storage areas of the non-volatile storage media based on the read bitmap data and the received addresses, where the bitmap data indicates valid storage areas and invalid storage areas of the non-volatile storage area.

According to still another aspect of the inventive concepts of the present invention, the controller is further configured to set write map data having an identical structure as the bitmap data, to sequentially compare the bitmap data and the write map data, to update the write map data according to the comparison result, and to invalidate the storage areas of the non-volatile storage media based on the bitmap data and the updated write map data.

According to still another aspect of the inventive concepts of the present invention, the controller is further configured to reset compared data of the write map data when the compared data of the bitmap data indicates an invalid storage area and the compared data of the write map data is in a set state during the comparison operation.

According to still another aspect of the inventive concepts of the present invention, the controller is further configured to inhibit invalidation of storage areas of the non-volatile storage area corresponding to compared data of the bitmap data when compared data of the write map data is in a set state during the comparison operation.

According to still another aspect of the inventive concepts of the present invention, the controller is further configured to set data of the write map data corresponding to the received addresses when the addresses are received.

According to still another aspect of the inventive concepts of the present invention, the controller and the non-volatile storage media form a Solid State Drive (SSD).

According to an aspect of the inventive concepts of the present invention, a computing system is provided. The computing system includes a non-volatile storage media configured to store meta data, a controller configured to control the non-volatile storage media, and a processor configured to read the meta data stored in the non-volatile storage media and to access the non-volatile storage media based on the read meta data. The controller is further configured to read the meta data stored in the non-volatile storage media and to invalidate storage areas of the non-volatile storage media based on the read meta data while inhibiting invalidation of second storage areas for which a specific time period has not yet passed since the processor last accessed the second storage areas.

BRIEF DESCRIPTION OF THE DRAWINGS

The above and other aspects and features of the present invention will become readily apparent from the detailed description that follows, with reference to the accompanying drawings, in which:

FIG. 3 is a schematic diagram illustrating the structure of a Master Boot Record (MBR);

FIG. 4 is a schematic diagram illustrating a partition record included in the MBR of FIG. 3;

FIG. 5 is a table illustrating partition types and corresponding ID values;

FIGS. 8 and 9 are a flow chart and schematic diagram, respectively, for use in describing one embodiment of a method of invalidating a deleted data area of a solid state memory;

DETAILED DESCRIPTION OF PREFERRED EMBODIMENTS

The present invention will now be described by way of preferred, but non-limiting, embodiments of the invention. It is emphasized here that the invention is not limited by the exemplary embodiments described below, and that instead the scope of the invention is delimited by the appended claims.

Figure 1:
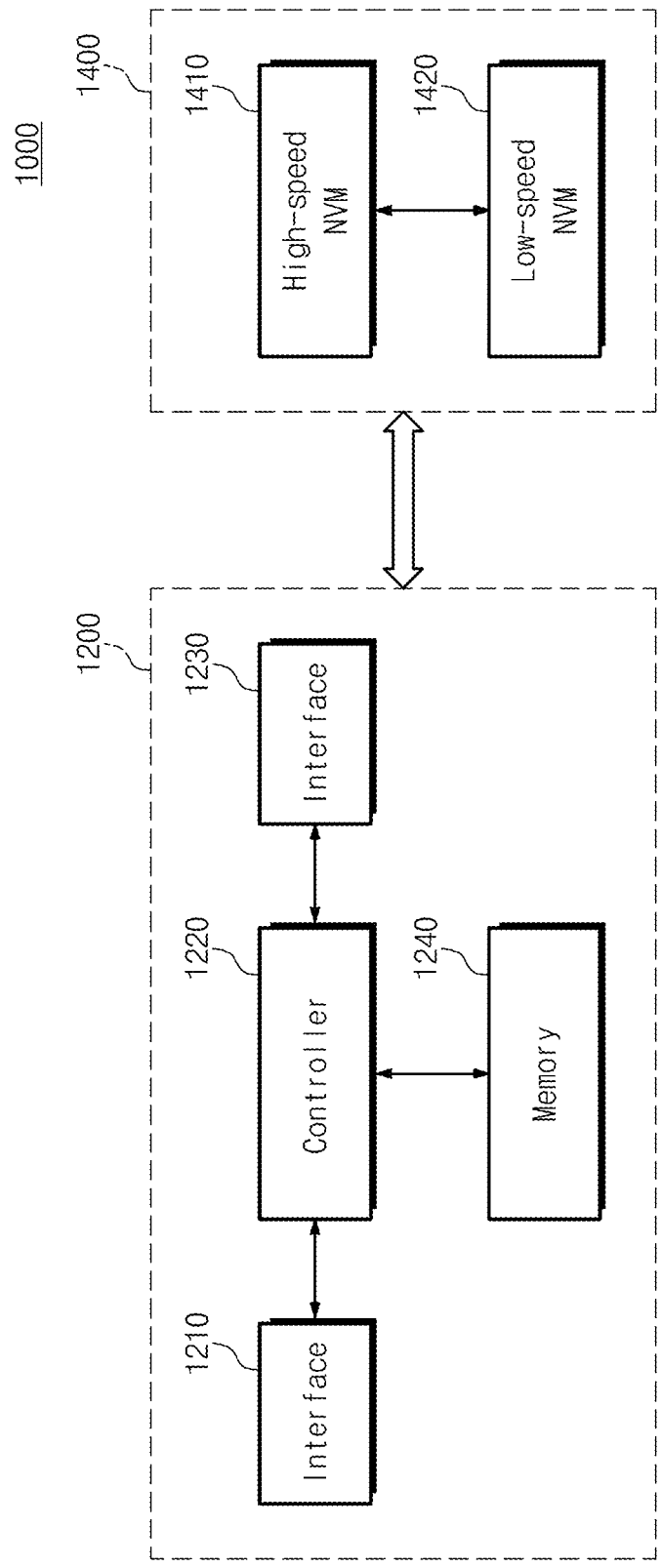
FIG. 1 is a block diagram of a solid state drive (SSD) according to an embodiment of the present invention.

For convenient description, inventive concepts of the present invention are described referring to the solid state drive (SSD) 1000 shown in FIG. 1. However the inventive concepts of the present invention are not limited to the SSD.

For example, the inventive concepts of the present invention can be applied to various systems including a controller and a non-volatile storage media.

For example, the inventive concepts of the present invention can be applied to memory cards such as Personal Computer Memory Cards International Association (PCMCIA) card, Compact Flash (CF) cards, Smart Media (SM) cards, Memory Sticks, Multimedia Cards (MMC), Reduced Size-MMC (RS-MMC), MMC micro, Secure Digital (SD) cards, mini SD cards, micro SD cards, SD high capacity (SDHC) cards.

For example, the inventive concepts of the present invention can be applied to one of various elements included in various systems such as Personal Computers (PC), Ultra Mobile PC (UMPC), Workstations, net-books, Personal Digital Assistants (PDA), portable PC, web tablets, wireless phones, mobile phones, smart phones, e-books, Portable Multimedia Players (PMP), portable video games, game consoles, navigations, black boxes, digital cameras, Digital Multimedia Broadcasting (DMB) players, digital audio recorders, digital audio players, digital picture recorders, digital picture viewers, digital video recorders, digital video players, devices communicating data through wireless channels, devices included in a home network, devices included in a computer network, devices included in a telematics network, Radio Frequency Identification (RFID) devices.

For convenient description of the inventive concepts of the present invention, both a term 'non-volatile storage media' and a term 'solid state memory' may be used in various places within this patent application to indicate the same device.

FIG. 1 illustrates a block diagram of a solid state drive (SSD) 1000 according to an embodiment of the present invention. As shown, the SSD 1000 of this example includes an SSD controller 1200 and non-volatile storage media 1400.

SSD controller 1200 includes first and second interfaces 1210 and 1230, a controller 1220, and a memory 1240.

First interface 1210 functions as a data I/O interface with a host device, such as a host central processing unit (CPU) (not shown). Non-limiting examples of first interface 1210 include Universal Serial Bus (USB) interfaces, Advanced Technology Attachment (ATA) interfaces, Serial ATA (SATA) interfaces, Parallel ATA (PATA) interfaces, Small Computer System Interface (SCSI) interfaces, Universal Serial Bus (USB) interfaces, Multimedia Card (MMC) interfaces, Peripheral Component Interconnection (PCI) interfaces, PCI-express (PCE-E) interfaces, Enhanced Small Disk (ESDI) interfaces, Integrated Drive Electronics (IDE) interfaces.

Second interface 1230 functions as a data I/O interface with the non-volatile storage media 1400. In particular, second interface 1230 is utilized to transmit/receive various commands, addresses and data to/from non-volatile storage media 1400. As will be apparent to those skilled in the art, a variety of different structures and configurations of second interface 1230 are possible, and thus a detailed description thereof is omitted here for brevity.

Controller 1220 and memory 1240 are operatively connected between first and second interfaces 1210 and 1230, and together function to control/manage the flow of data between the host device (not shown) and non-volatile storage media 1400. Memory 1240 may, for example, be a DRAM type of memory device, and controller 1220 may, for example, include a central processing unit (CPU), a direct memory access (DMA) controller, and an error correction control (ECC) engine. Examples of controller functionality may be found in commonly assigned U.S. Patent Publication 2006-0152981, the contents of which are incorporated herein by reference. The operations generally executed by controller 1220 (and memory 1240) to transfer data between the host device (not shown) and SSD memory banks are understood by those skilled in the art, and thus a detailed description thereof is omitted here for brevity.

Still referring to FIG. 1, non-volatile storage media 1400 of this example includes a high-speed non-volatile memory (NVM) 1410 and a low-speed non-volatile memory (NVM) 1420. However, the embodiments are not limited to configurations containing dual-speed memories. That is, non-volatile storage media 1400 may instead consist of a single type of memory operating at a single speed.

As the names suggest, high-speed NVM 1410 is capable of operating at a relatively higher speed (e.g., random write speed) when compared to low-speed NVM 1420.

In an exemplary embodiment, high-speed NVM 1410 is single-level cell (SLC) flash memory, and low-speed NVM 1420 is multi-level cell (MLC) flash memory. However, other embodiments are possible. For example, high-speed NVM 1410 may instead comprised phase-change random access memory (PRAM), or MLC flash memory in which one bit per cell is utilized. Also, high-speed NVM 1410 and low-speed NVM 1420 may comprise the same type of memory (e.g., SLC or MLC or PRAM), where the operational speed is differentiated by fine-grain mapping in high-speed NVM 1410 and coarse-grain mapping in low-speed NVM 1420.

Generally, high-speed NVM 1410 is utilized to store frequently accessed (written) data such as metadata, and low-speed NVM 1420 is utilized to store less frequently accessed (written) data such as media data. In other words, as will discussed later herein, a write frequency of data in high-speed NVM 1410 is statistically higher than a write frequency of data in low-speed NVM 1420. Also, due to the nature of the respective data being stored, the storage capacity of low-speed NVM 1420 will typically be much higher than that of high-speed NVM 1410. A more detailed discussion of examples in which high-speed and low-speed memories are efficiently utilized to store different types of data can be found in commonly assigned U.S. non-provisional application Ser. No. 12/015,548, filed Jan. 17, 2008, the entire contents of which are incorporated herein by reference. Again, however, the embodiments herein are not limited to the use of two or more memories operating at different speeds.

Figure 2:
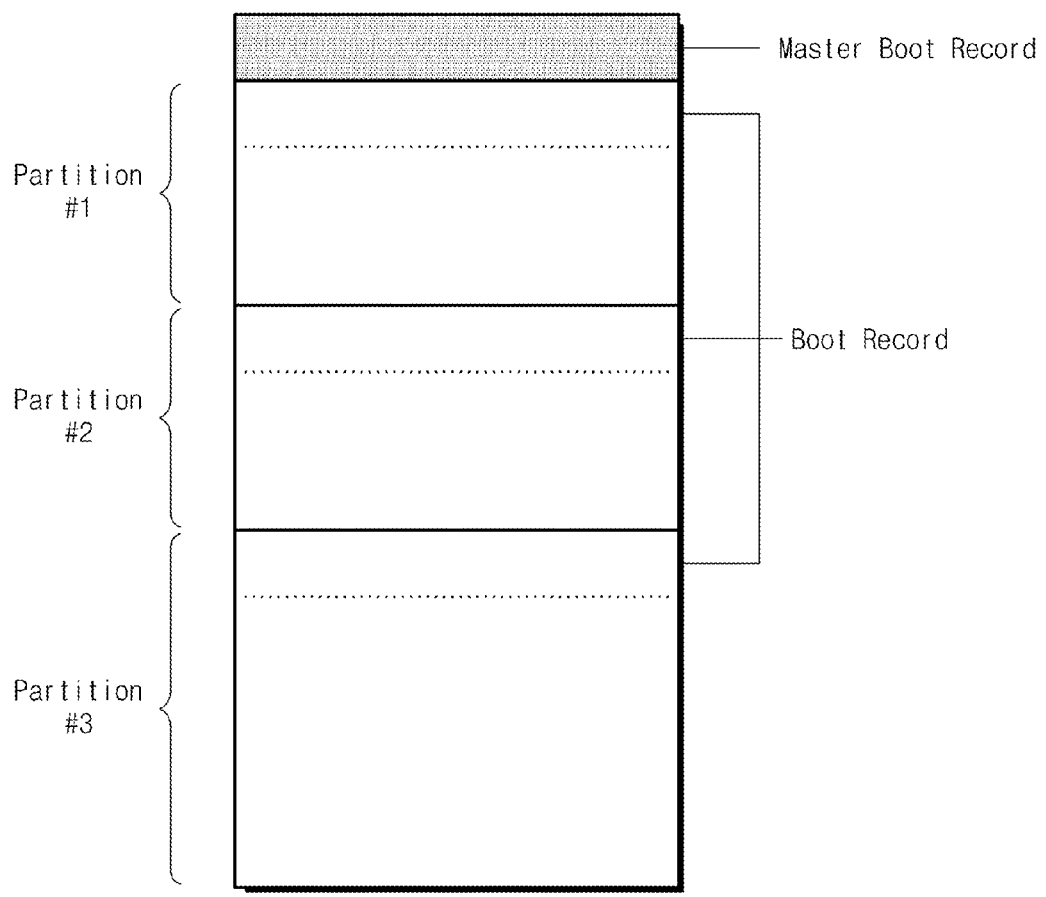
FIG. 2 is a schematic diagram illustrating the logical partitioning of a memory of a solid state drive.

FIG. 2 illustrates an example of the logical partitioning of the non-volatile storage media 1400. As shown, the first "sector" of the solid-state memory contains a master boot record (MBR), and remaining sectors of the memory are divided into a number of partitions. In addition, each partition generally includes a boot record at a logical front end thereof.

FIG. 3 illustrates a 512-byte example of the MBR shown in FIG. 2. Generally, the MBR is utilized, for example, to maintain the primary partition table of the solid-state memory. It may also be used in bootstrapping operations after the computer system's BIOS transfers execution to machine code instructions contained within the MBR. The MBR may also be used to uniquely identify individual storage media.

FIG. 4 illustrates an example of the layout of a single 16-byte partition record of the MBR illustrated in FIG. 3. In the example of the IBM Partition Table standard, four (4) of the partition records illustrated in FIG. 4 are contained with the partition table of the MBR.

FIG. 5 is a table illustrating partition types and corresponding ID values. In this respect, the Operating System (O/S) of a CPU can additionally create a plurality of partitions in a specified primary partition. This is referred to as "Extended Partition." Each partition created on extended partition is referred to as a logical partition, and each logical partition can adapt the same or different file system.

It is noted here that the above-described MBR scheme represents just one of several standards in an ever-evolving industry. For example, the Extensible Firmware Interface (EFI) standard has been proposed as a replacement for the PC BIOS standard. Whereas PC BIOS utilizes the MBR scheme as described above, the EFI standard utilizes a GUID Partition Table (GPT) as the standard for the layout of a partition table in a logically partitioned solid-state drive. The present invention is not limited to any particular partitioning standard.

Data contained in the MBR's (or GUID's) partitioning table of FIG. 3 is an example of "storage-level" metadata, i.e., metadata associated with logical storage areas of the solid state memory. This is in contrast with "file system level" metadata which is metadata associated with the file system of the computer system. File system examples include File Allocation Table (FAT), New Technology File System (NTFS), Second and Third Extended File Systems (ext2 and ext3).

That is, when a user deletes a file in the solid state memory 1400, the file system running on the system processes the delete command and, from the user's point of view, appears to remove the file from memory 1400. In reality, however, conventional file systems leave the file data in physical memory, and instead, the data is deemed "invalid". A host system includes an application program that communicates with a file system. A Flash Translation Layer (FTL) keeps track of the physical location of memory units associated with files in the solid state memory 1400 so the file system need only reference logical memory units.

As will be explained in more detail below, embodiments of the invention are at least partially directed to monitoring updated metadata in order locate the positions of invalid data stored in the solid state memory system.

The metadata that is monitored may be storage level metadata or file system level metadata. In the case of storage level metadata, for example, the metadata may be contained in a partition table, and invalid data is located in accordance with changes in the metadata of the partition table.

In one embodiment, for example, a determination is made as to whether partition metadata of the solid state memory has changed, and if so, the partition metadata is analyzed to locate invalid data stored in the solid state memory. This analysis may include determining that a file system type of a partition has changed, and invalidating data in response to the changed file system type. Alternately, or in addition, the analysis may include determining that a partition has changed, and invalidating data in response to the changed partition.

Figure 6:
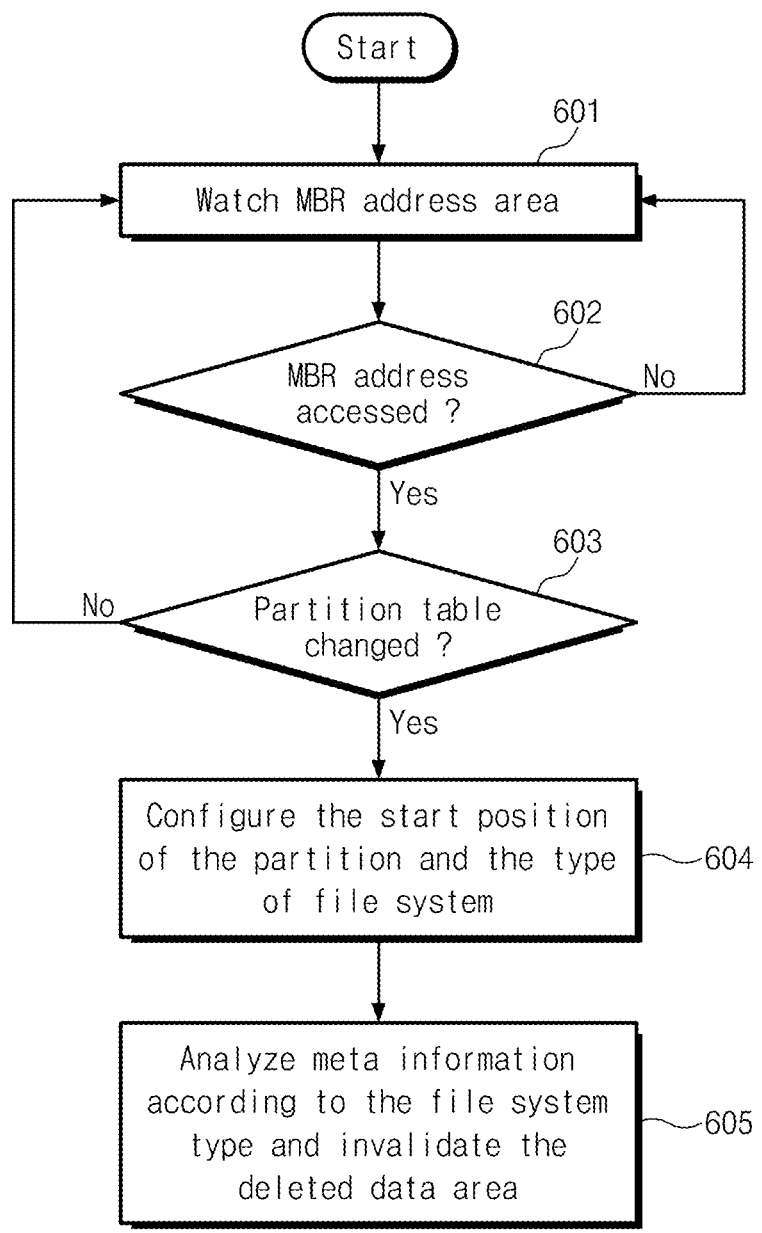
FIGS. 6 and 7 are a flow chart and schematic diagram, respectively, for use in describing one embodiment of a method of locating an invalid data area of a solid state memory.
Figure 7:
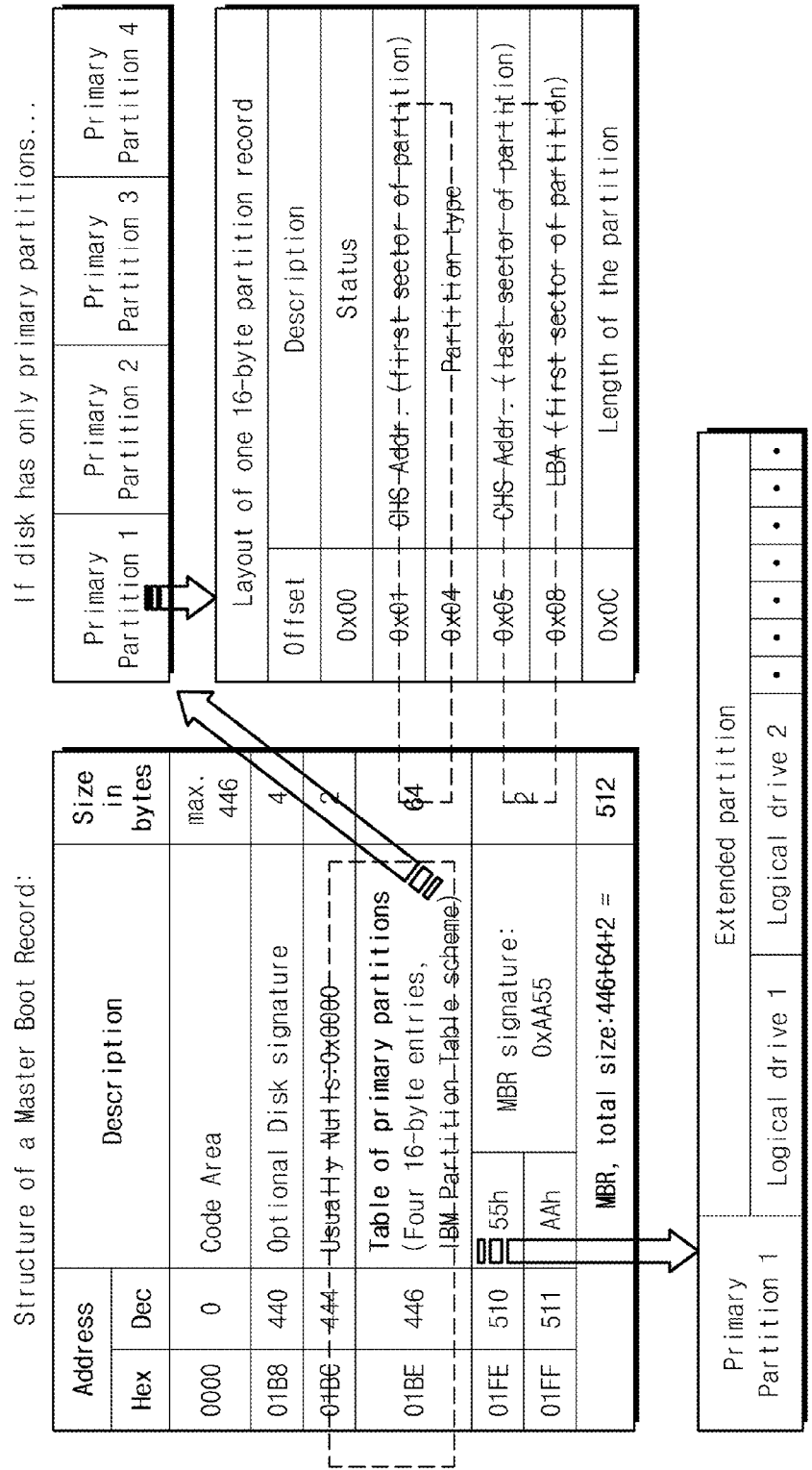

Reference is now made to FIGS. 6 and 7 with respect to one embodiment of a method of invalidating a deleted data area of a solid state memory.

Generally, this embodiment relates to the monitoring of metadata contained in a partition table, such as the standard Table of Primary Partitions of an MBR in a BIOS system. In step 601 and 602 of FIG. 6, the MBR address area is monitored to determine whether an MBR address has been accessed. Examples of the MBR, primary partitions, and partition record are illustrated in FIG. 7.

Once it has been determined that an MBR address has been accessed, a determination is made at step 603 as to whether the Partition Table has been changed. For example, the Partition Table may be altered in the situation where a partition is divided. In this case, all data in the divided partition becomes invalid.

In the case of an affirmative determination at step 603, the start position of the partition and the type of file system (partition type) are configured in step 604 of FIG. 6. Then, at step 605, the metadata is analyzed according to the file system type, and the deleted data area is invalidated.

Figure 8:
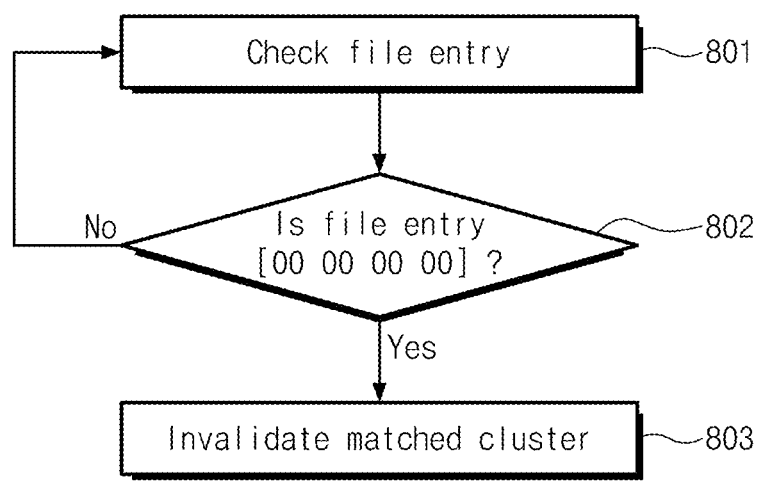

Reference is now made to FIGS. 8 and 9 with respect to one embodiment of a method of invalidating a deleted data area of a solid state memory.

Generally, this embodiment relates to the monitoring of metadata contained in a File Allocation Table (FAT). In particular, by examining cluster linkages (or lack thereof), a determination is made as to whether data associated with the clusters is deleted data.

Generally, a file system that may be used to store files in a flash type solid state memory has a unit of memory allocation defined that specifies the smallest logical amount of disk space that can be allocated to hold a file. For example, the MS-DOS file system known as the File Allocation Table (FAT) calls this unit of memory allocation a cluster.

In the method of FIG. 8, the file entry is initially checked at step 801, and at step 802, a determination is made as to whether the file entry is [00 00 00 00]. If the determination at step 802 is affirmative, the matched clusters are not linked and the data thereof is invalidated at step 803.

Figure 10:
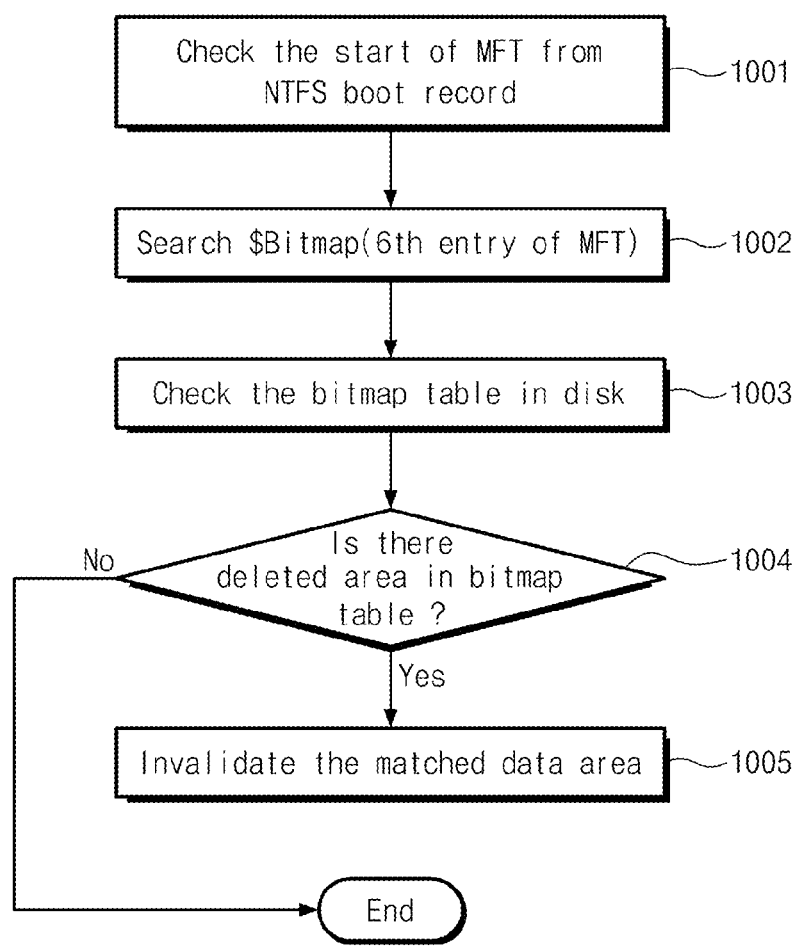
FIGS. 10 and 11 are a flow chart and schematic diagram, respectively, for use in describing another embodiment of a method of invalidating a deleted data area of a solid state memory.
Figure 11:
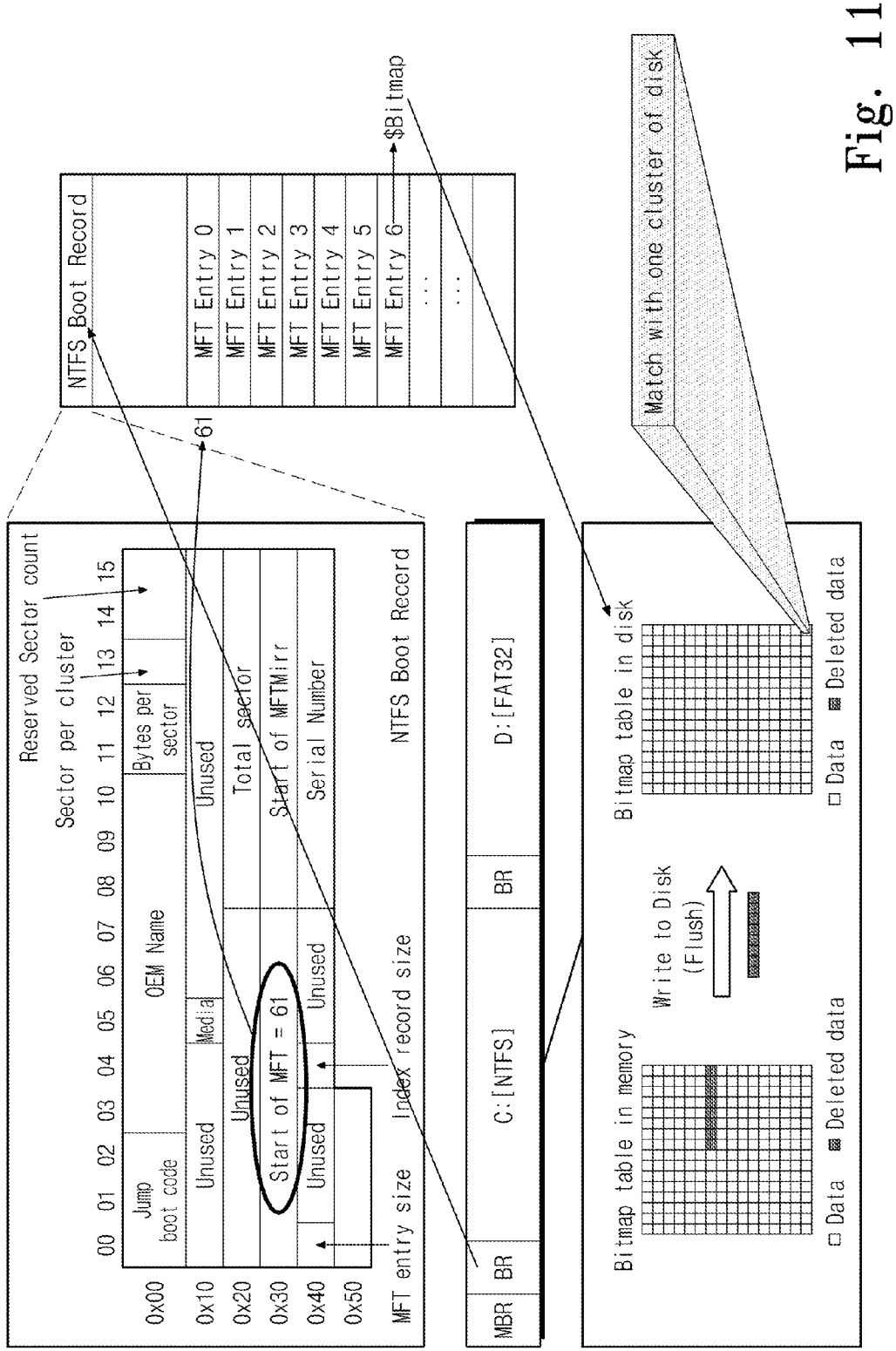

Reference is now made to FIGS. 10 and 11 with respect to another embodiment of a method of invalidating a deleted data area of a solid state memory.

Generally, this embodiment relates to the monitoring of metadata contained in the New Technology File System (NTFS). In an initial step 1001, the start of the Master File Table (MFT) from the NTFS boot record is checked. In this example, the $Bitmap which is the sixth ($6^{th}$) entry of the MFT is then searched at step 1002, and then the bitmap table is checked at step 1003. A determination is then made as to whether a deleted area exists in the bitmap table at step 1004, and if the answer is affirmative, the matched data area is invalidated.

By invalidating data or data areas as described above, it becomes possible to execute a merge operation in the solid state disk (SSD) drive without copying the invalid data. In addition, for example, garbage collection systems can be made more efficient.

Figure 12:
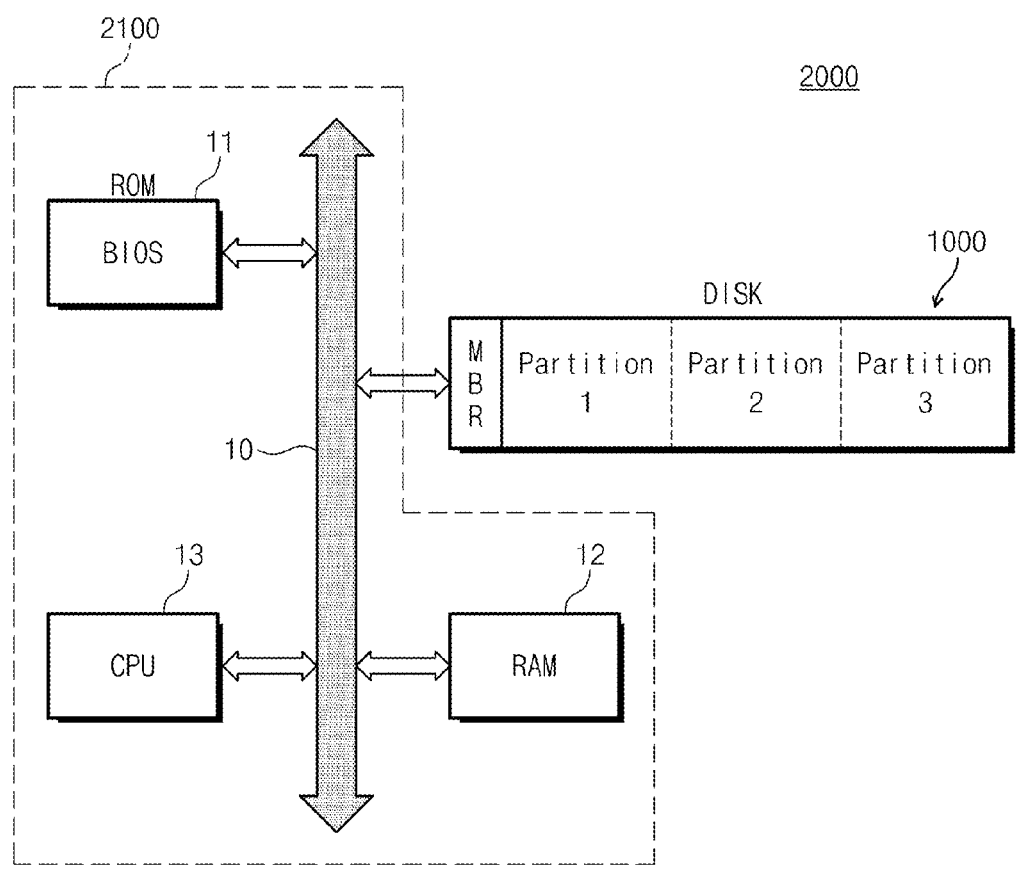
FIG. 12 is a system level diagram of one embodiment of a computer system.

FIG. 12 is a block diagram illustrating one embodiment of a computer system 2000. As shown, computer system 2000 includes a bus system 10, and a read-only memory (ROM) 11 which is connected to bus system 10 and stores software (e.g., BIOS) utilized to initialize computer system 2000. Computer system 2000 also includes a random access memory (RAM) 12 which functions as a working memory, a central processing unit (CPU) 13, and solid state drive (SSD) 1000 all connected to the bus system 10.

SSD 1000 includes the non-volatile storage media 1400 and the controller 1200 (see FIG. 1). For convenient illustration, the MBR and the first to third partitions are shown in SSD 1000, in FIG. 12 instead of SSD controller 1200 and non-volatile storage media 1400. However, it can be understood that the MBR and the first to third partitions pertain to SSD 1000.

In the example illustrated in FIG. 12, SSD 1000 includes a Master Boot Record and is logically divided into plural partitions. As described in connection with previous embodiments herein, controller 1200 of the SSD 1000 is configured to logically partition non-volatile storage media 1400, update metadata of logically partitioned non-volatile storage media 1400, and monitor updated metadata to locate invalid data stored in non-volatile storage media 1400.

Hereinafter it will be assumed that ROM 11, RAM 12, CPU 13 and bus system 10 constitute a host 2100. That is, computer system 2000 includes host 2100 and SSD 1000 communicating with host 2100.

Figure 13:
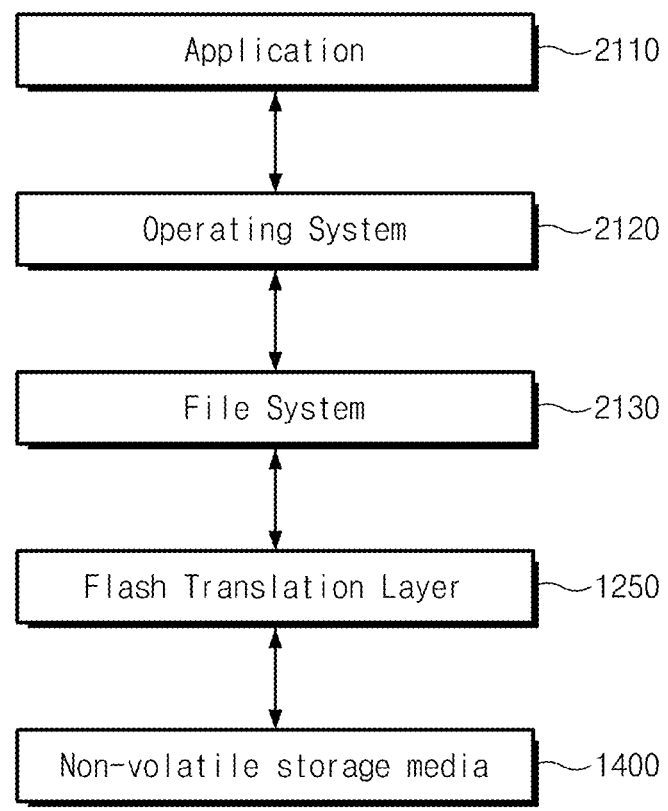
FIG. 13 is a block diagram illustrating a software hierarchy of the computer system in FIG. 12.

FIG. 13 is a block diagram illustrating a software hierarchy of computer system 2000 in FIG. 12. Referring to FIGS. 12 and 13, the software hierarchy of computer system 2000 includes an application 2110, an Operating System (OS) 2120, a file system 2130, a Flash Translation Layer (FTL) 1250 and non-volatile storage media 1400 of SSD 1000.

Application 2110 represents various application programs stored in computer system 2000. For example, application 2110 may include a word processing program, a spreadsheet, a database, an internet browser, a music player, a video player, etc. For example, the application 2110 may be stored by CPU 13 of host 2100.

OS 2120 may control various operations of computer system 2000. For example, OS 2120 may include Windows, Windows CE, Windows mobile, Mac OS, Linux, Disk Operating System (DOS), Android, Bada, Unix, Virtual Memory System (VMS), OS/2, Solaris, Symbian OS, Palm OS, Berkeley Software Distribution (BSD), IPhone OS, IPad OS, Chrome OS, etc. For example, OS 2120 may be stored by host 2100.

File system 2130 may manage storage areas of SSD 1000 and manage data stored into SSD 1000. For example, application 2110 and/or OS 2120 may access SSD 1000 through file system 2130. For example, file system 2130 may include File Allocation Table (FAT), FAT32, New Technology File System (NTFS), Hierarchical File System (HFS), XFS, Journaled File System (JFS), On-Disk Structure 2 (ODS-5), ODS-5, Universal Disk Format (UDF), Veritas, Quick File System (QFS), ZFS, Unix File System (UFS), second edition file system (ext2), ext3, ext4, ReiserFS, Reiser4, Global File System (GFS), GFS2, Oracle Cluster File System (OCFS), OCFS2, New Implementation of a Log-structured File System (NILFS) ISO 9660, Virtual File System (VFS), Gnome VFS, Be File System (BFS), etc. For example, file system 2130 may be driven by the host 2100.

FTL 1250 performs interfacing between the file system 2130 and the non-volatile storage media 1400. For example, FTL 1250 performs mapping between logical addresses of file system 2130 and physical addresses of non-volatile storage media 1400. Furthermore, FTL 1250 controls background operations of non-volatile storage media 1400. For example, FTL 1250 may control a merge operation, a garbage collection operation and a wear leveling operation of the non-volatile storage media 1400. For example, when the non-volatile storage media is defined as a specific type of memory such as a Programmable ROM (PROM), an Electrically Programmable ROM (EPROM), an Electrically Programmable Erasable PROM (EEPROM), a flash memory, a Phase-change RAM (PRAM), a Ferro-electric RAM (FeRAM), a Resistive RAM (RRAM) or a Magnetic RAM (MRAM), FTL 1250 can be optimized based on the specific memory type of non-volatile storage media 1400.

For example, FTL 1250 may be stored by SSD controller 1200. In an embodiment, FTL 1250 may be stored in non-volatile storage media 1400. SSD controller 1200 may read FTL 1250 from non-volatile storage media 1400 (e.g., during a power-on reset operation) and store the read FTL 1250. In another example, SSD controller 1200 may further include a non-volatile memory (not shown) storing FTL 1250. SSD controller 1200 may read FTL 1250 from the non-volatile memory and store the read FTL 1250.

Figure 14:
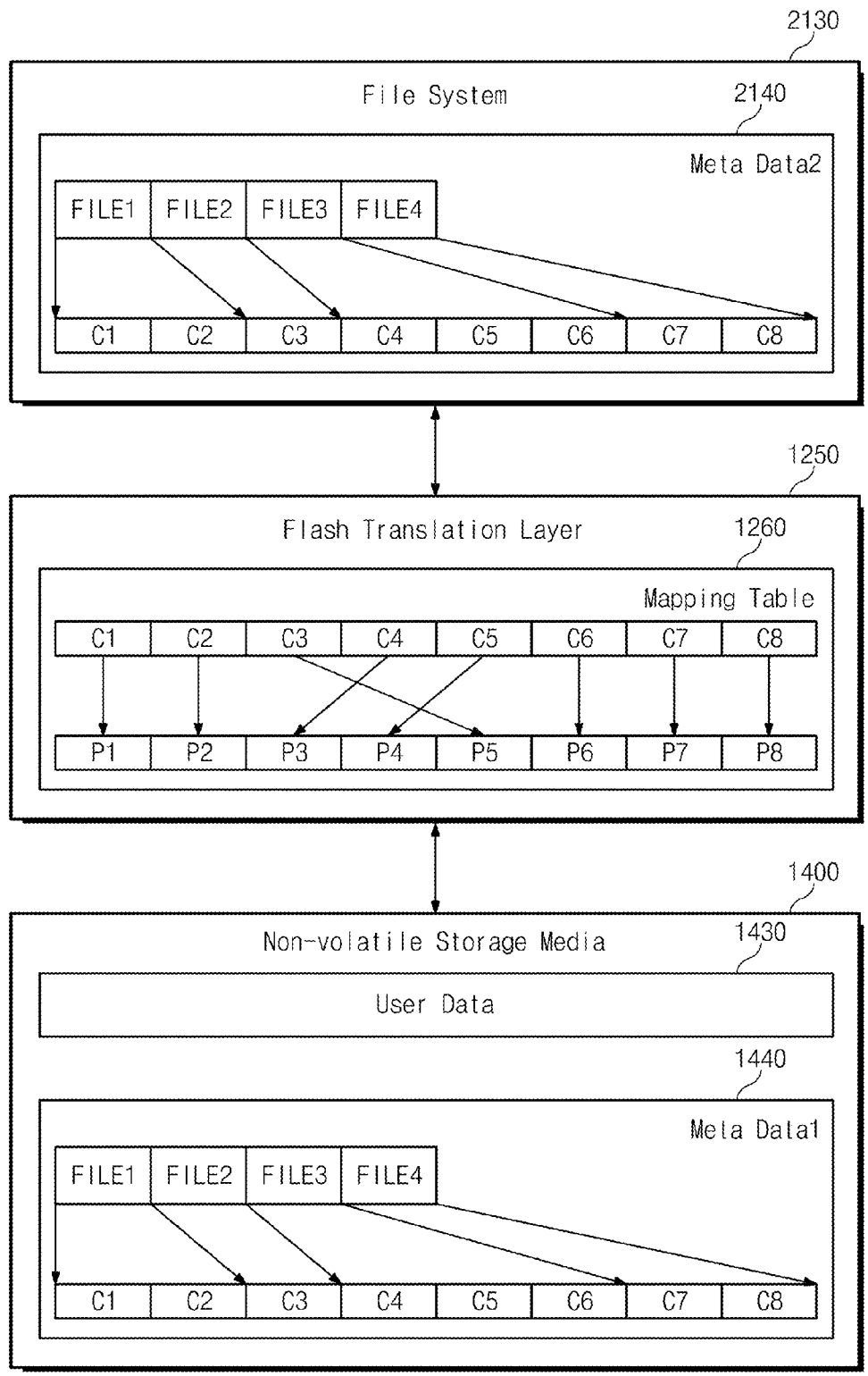
FIG. 14 is a block diagram illustrating an example embodiment of the file system, the File Translation Layer (FTL) and the non-volatile storage media of the software hierarchy of FIG. 13.

FIG. 14 is a block diagram illustrating file system 2130, FTL 1250 and non-volatile storage media 1400. Referring to FIG. 14, non-volatile storage media 1400 stores user data 1430 and first meta data 1440.

User data 1430 indicates data written into non-volatile storage media 1400 by a user. First meta data 1440 includes information for accessing the non-volatile storage media 1400. For example, first meta data 1440 includes information about cluster allocation, file allocation, etc. as described above. That is, first meta data 1440 includes information about a file system (or file structure) of non-volatile storage media 1400.

File system 2130 is stored in host 2100. File system 2130 drives meta data including second meta data 2140. For example, file system 2130 manages storage areas of various storage devices which are connected to the host 2100 based on meta data, including second meta data 2140. For convenience of description, it is assumed that second meta data 2140 corresponds to the non-volatile storage media 1400. That is, the file system 2130 manages storage areas of non-volatile storage media 1400 based on second meta data 2140.

For example, file system 2130 read first meta data 1440 from non-volatile storage media 1400, and drives the read first meta data 1440 as the second meta data 2140. For example, upon connection of SSD 1000 or upon supply of a power, file system 2130 may read first meta data 1440 from non-volatile storage media 1400.

In an embodiment, second meta data 2140 includes allocation information between first to fourth files FILE1 to FILE4 and logical storage areas (e.g., first to eighth clusters C1 to C8). The first file FILE1 is allocated to the first and second clusters C1 and C2. The second file FILE2 is allocated to the third cluster C3. The third file FILE3 is allocated to the fourth to sixth clusters C4 to C6. The fourth file FILE4 is allocated to the seventh and eighth clusters C7 and C8.

Based on second meta data 2140, file system 2130 may issues an access request to non-volatile storage media 1400. For example, when first file FILE1 is to be accessed, file system 2130 may transfer an access request with addresses corresponding to the first and second clusters C1 and C2 to non-volatile storage media 1400.

FTL 1250 drives a mapping table 1260. Mapping table 1260 includes mapping information between the logical storage areas (e.g., the first to eighth clusters C1 to C8) and the physical storage areas (e.g., first to eighth pages P1 to P8).

For example, a unit of the logical storage areas may correspond to a sector, a cluster, etc. For example, a unit of the physical storage areas may correspond to a word, a sector, a page, a memory block, etc. Hereinafter, it is assumed that a unit of the logical storage areas and a unit of the physical storage areas correspond to a cluster and a page, respectively.

Referring to mapping table 1260, it is shown that the first and second cluster C1 and C2 correspond to first and second pages P1 and P2, respectively. The third cluster C3 corresponds to the fifth page P5. The fourth and fifth clusters C4 and C5 correspond to the third and fourth pages P3 and P4, respectively. The sixth to eighth clusters C6 to C8 correspond to the sixth to eighth pages P6 to P8, respectively.

When the access request with the addresses of the first and second clusters C1 and C2 is received, FTL 1250 may detect addresses of the first and second pages P1 and P2 corresponding to the first and second clusters C1 and C2 by referring to mapping table 1260.

Figure 15:
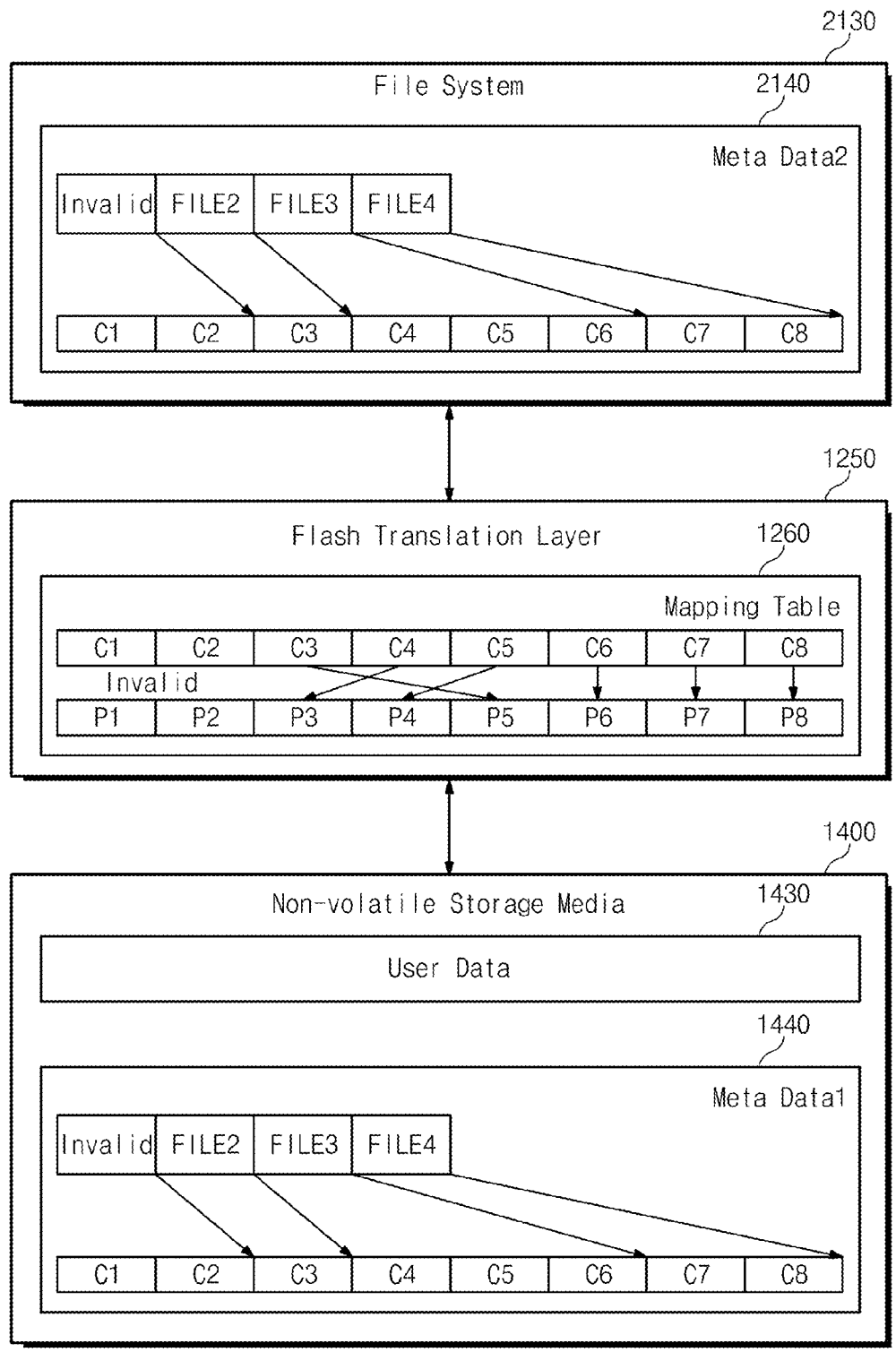
FIG. 15 is a block diagram illustrating a file system, an FTL and a non-volatile storage media when a first file is deleted.

FIG. 15 is a block diagram illustrating file system 2130, FTL 1250 and non-volatile storage media 1400 when the first file FILE1 is deleted. Referring to FIG. 15, it is assumed that first file FILE1 is deleted.

As described above referring to FIGS. 1 to 11, FTL 1250 is configured to access first meta data 1440 stored in non-volatile storage media 1400. For example, FTL 1250 is configured to read first meta data 1440 stored in non-volatile storage media 1400 and invalidate storage areas of non-volatile storage media 1400 based on the read first meta data 1440.

More particularly, when the first file FILE1 is deleted (e.g., by a user), file system 2130 invalidates the first file FILE1 in second meta data 2140. For example, file system 2130 may delete allocation information between the first file FILE1 and the first and second clusters C1 and C2. Then, the file system 2130 may acknowledge that the first and second clusters C1 and C2 are free storage areas.

The file system 2130 may store the updated second meta data 2130 into non-volatile storage media 1400 as first meta data 1440. For example, file system 2130 may update first meta data 1440 upon an update of second meta data 2140 to equalize first and second meta data 1440 and 2140.

In an embodiment, file system 2130 and FTL 1250 may be configured to write a portion of second meta data 2140 into non-volatile storage media 1400. For example, file system 2130 and FTL 1250 may be configured to write updated meta data of second meta data 2140 into non-volatile storage media 1400.

FTL 1250 may read first meta data 1440 from non-volatile storage media 1400. FTL 1250 may detect invalid storage areas from the read first meta data 1440. For example, when FTL 1250 detects newly invalidated storage areas from the read first meta data 1440, FTL 1250 may invalidate storage areas of non-volatile storage media 1400 corresponding to the invalid storage areas detected from first meta data 1440. For example, FTL 1250 may invalidate mapping information of mapping table 1260 corresponding to the invalid storage area detected from first meta data 1440. For example, the FTL 1250 may delete the storage areas corresponding to the invalid storage areas detected from the first meta data 1440.

As shown in FIG. 15, first meta data 1440 indicates that the first and second clusters C1 and C2 are invalid storage areas. FTL 1260 may detect that first and second clusters C1 and C2 are invalid storage areas by reading first meta data 1440. Then, FTL 1250 may invalidate storage areas of non-volatile storage media 1400 corresponding to the first and second clusters C1 and C2.

For example, FTL 1250 may invalidate the first and second pages P1 and P2 corresponding to the first and second clusters C1 and C2. For example, FTL 1250 may invalidate a mapping relationship between the first and second clusters C1 and C2 and the first and second pages P1 and P2. For example, FTL 1250 may set at least one mark bit indicating that data stored in the first and second pages P1 and P2 are invalid. For example, FTL 1250 may delete the first and second pages P1 and P2.

When the first and second pages P1 and P2 are invalidated or deleted, invalid or deleted data stored in the first and second pages P1 and P2 are not copied during background operations such as a merge operation. Thus, operating speed of SSD 1000 is advanced. Furthermore, when the first and second pages P1 and P2 are invalidated or deleted, the first and second pages P1 and P2 can be assigned to free storage areas during background operations such as a garbage collection operation.

Figure 16:
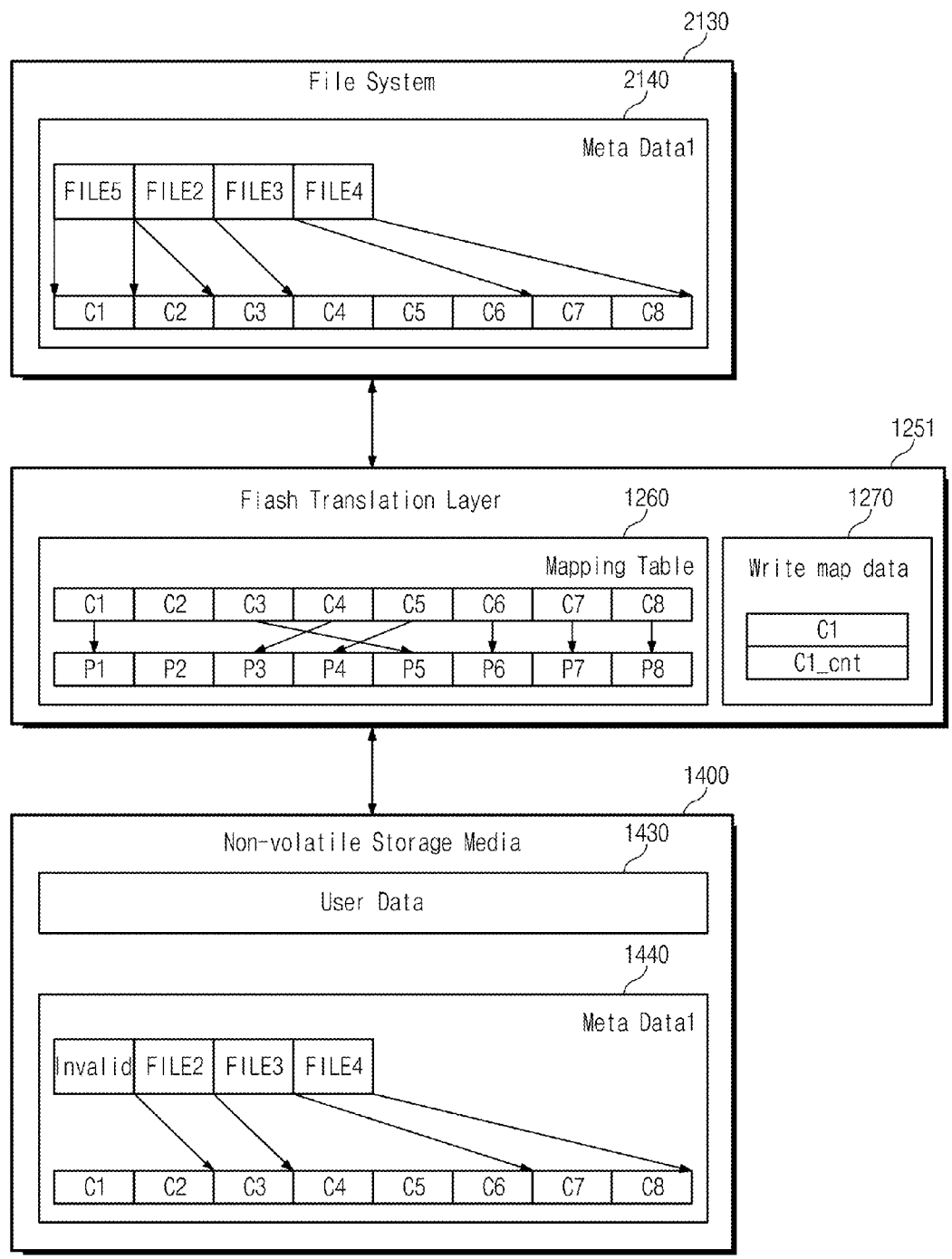
FIG. 16 is a block diagram illustrating a file system, an FTL and a non-volatile storage media when a fifth file FILE5 is written.

FIG. 16 is a block diagram illustrating file system 2130, FTL 1251, and non-volatile storage media 1400 when a fifth file FILE5 is written. Referring to FIG. 16, the FTL 1251 further comprises write map data 1270.

When data is written, FTL 1251 is configured to generate write map data 1270. For example, write map data 1270 may be stored at a memory 1240 of the SSD controller 1200. For example FTL 1251 assigns a portion of storage areas of the memory 1240 to write map data 1270 and maintains the assigned storage areas.

FTL 1251 is configured to add or write addresses received from file system 2130 into write map data 1270. For example, FTL 1251 is configured to add or write addresses corresponding to a write request received from file system 2130 into write map data 1270.

FTL 1251 is configured to invalidate storage areas of non-volatile storage media 1400 based on first meta data 1440 stored in non-volatile storage media 1400 and write map data 1270.

Figure 17:
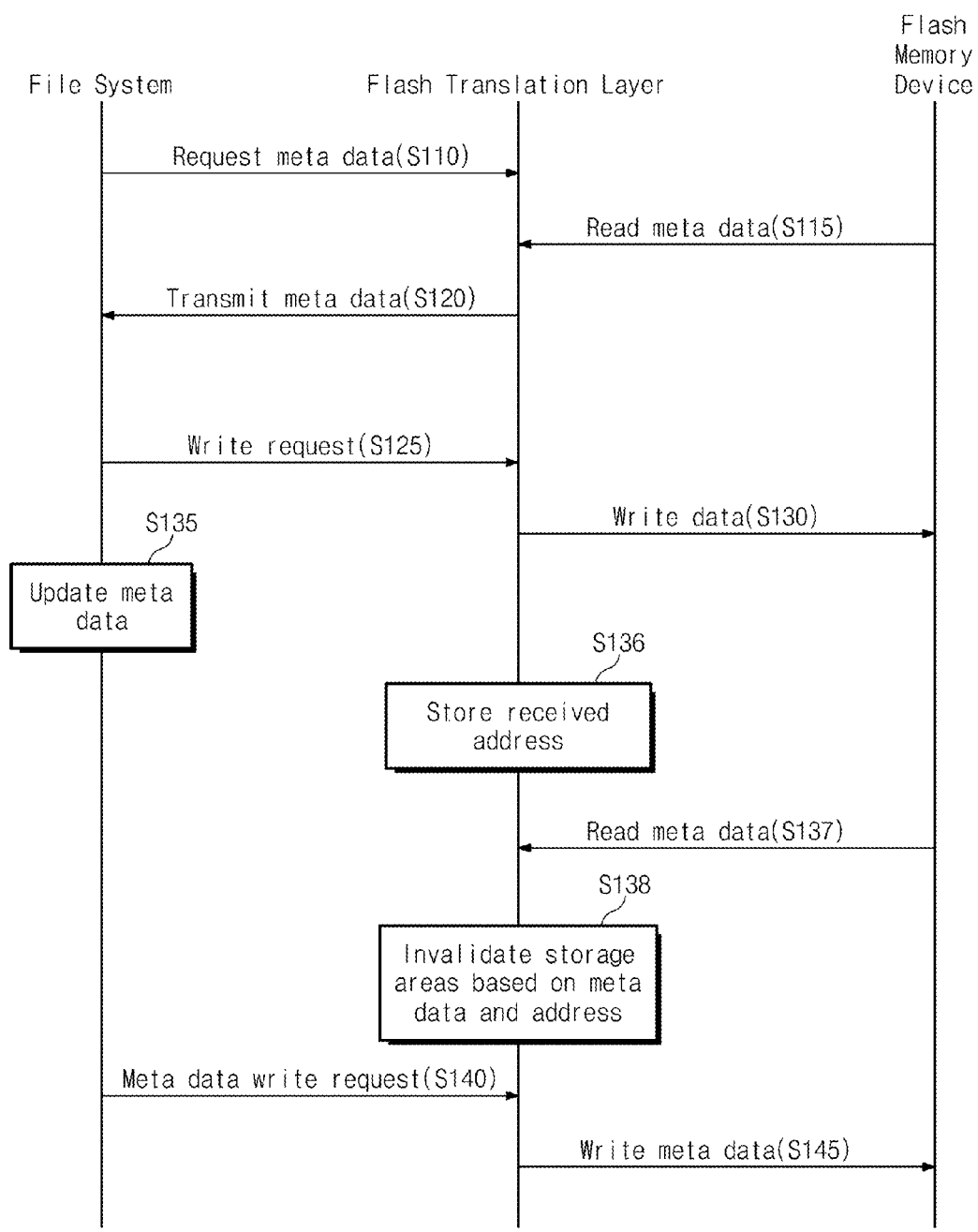
FIG. 17 is a flow chart illustrating an operating method of a file system, an FTL and a non-volatile storage media.

FIG. 17 is a flow chart illustrating an operating method of file system 2130, FTL 1251 and non-volatile storage media 1400. Referring to FIGS. 16 and 17, the file system 2130 issues a request for first meta data 1440 to FTL 1251 in a step S110. For example, file system 2130 may transmit a read command and logical addresses corresponding to first meta data 1440 to FTL 1251.

In s step S115, FTL 1251 reads first meta data 1440 from non-volatile storage media 1400. For example, the FTL 1251 may translate the received logical addresses from file system 2130 into physical addresses, and perform a read operation based on the translated physical addresses.

In a step S120, FTL 1251 transfers the read first meta data 1440 to file system 2130. File system 2130 may store the received first meta data as the second meta data 2140. Then, file system 2130 may issue various access requests for user data 1430 and first meta data 1440 stored in non-volatile storage media 1400 based on second meta data 2140.

For example, steps S110 to S120 may constitute an initialization process. For example steps S110 to S120 may be performed upon power-on of computer system 2000, upon connection of SSD 1000 to computer system 2000, or upon power-on of SSD 1000.

In a step S125, file system 2130 issues a write request to FTL 1251. For example, file system 2130 may transfer a write command, logical addresses corresponding to user data 1430, and user data for writing. For example, file system 2130 may issue a write request for a fifth file FILE5. For example, file system 2130 may assign clusters to data to be written and transfer the assigned cluster addresses to FTL 2151. As shown in FIG. 16, file system 2130 may assign the first cluster C1 to the fifth file FILE5.

In a step S130, FTL 1251 writes data into non-volatile storage media 1400. For example, FTL 1251 may assign physical addresses to the received fifth file FILE5. Then, FTL 1251 may write the received fifth file FILE5 into storage areas corresponding to the assigned physical addresses and generate mapping information between the received logical addresses and the assigned physical addresses. As shown in FIG. 16, the FTL 1251 may write fifth file FILE5 into the first page P1.

In a step S135, the file system 2130 updates meta data. For example, file system 2130 may update meta data corresponding to the written user data. For example, file system 2130 may update second meta data 2140 stored in the file system 2130. For example, file system 2130 may set storage areas in which the user data is written as valid storage areas.

It is not limited that step S135 is performed after steps S125 and S130. For example, step S135 can be performed before, simultaneously with, between, or after steps S125 and S130.

In a step S136, FTL 1251 stores addresses received from file system 2130. For example, FTL 1251 may store addresses corresponding to the write request for the fifth file FILE5 received from file system 2130. For example, FTL 1251 may store addresses into write map data 1270. In an embodiment, an operation for storing the received addresses is not limited to be performed after the write operation performed during steps S125 to S135. For example, step S136 can be performed before, simultaneously with, between, or after the steps S125 to S135.

In a step S137, FTL 1251 reads first meta data 1440 from non-volatile storage media 1400. For example, FTL 1251 may read first meta data 1440 during an idle time of SSD 1000.

In a step S138, FTL 1251 invalidates storage areas of non-volatile storage media 1400 based on the read first meta data 1440 and write addresses. For example, FTL 1251 may invalidate storage areas based on the read first meta data 1440 and the addresses stored in write map data 1270.

For example, FTL 1251 may detect invalid storage areas from read first meta data 1440. FTL 1251 may invalidate (or delete) the detected invalid storage areas except for storage areas corresponding to the addresses stored in the write map data 1270. For example, FTL 1251 may invalidate (or delete) the detected storage areas but inhibit invalidation (or deletion) of storage areas corresponding to the addresses stored in write map data 1270.

In a step S140, file system 2130 issues write request for a meta data to the FTL 1250. For example, file system 2130 may request for writing second meta data 2140 stored in the file system 2130 into non-volatile storage media 1400 as the first meta data 1440. For example, file system 2130 may transfer a write command, logical addresses corresponding to the first meta data 1440 and second meta data 2140 to FTL 1251.

In a step S145, FTL 1251 may write meta data into non-volatile storage media 1400. For example, FTL 1251 may translate the received logical addresses into physical addresses. Then FTL 1251 may write received second meta data 2140 into storage areas corresponding to the translated physical addresses. That is, first meta data 1440 stored in non-volatile storage media 1400 is updated to be identical to second meta data 2140 stored in file system 2130.

In an embodiment, an operation of writing meta data stored at host 2100 into SSD 1000 is called a flush operation. The flush operation may be performed during idle time of SSD 1000 or computer system 2000. The flush operation may be performed periodically during idle time of SSD 1000 or computer system 2000.

Before the flush operation, the first meta data stored in non-volatile storage media 1400 and the second meta data driven are able to be different each other. That is, first meta data 1440 indicates that the first page P1 stores invalid data before the flush operation is performed even though second meta data 2140 indicates that the first cluster C1 stores the fifth file FILE5. When FTL 1251 performs an invalidation operation before the flush operation, FTL 1251 may invalidate (or delete) the first page P1. That is, newly written data can be invalidated (or deleted) in a flush based computer system.

According to embodiments of a memory system and method described here, invalidation of storage areas corresponding to write addresses stored in write map data 1270 are inhibited during a specific time after a write operation. That is, FTL 1251 holds or delays the invalidation operation of storage areas corresponding to newly written data until the flush operation is performed. Thus, reliabilities of SSD 1000 and computer system 2000 are advanced.

In an embodiment, file system 2130 and FTL 1251 may be configured to write a portion of second meta data 2140 into non-volatile storage media 1400. For example, file system 2130 and FTL 1251 may be configured to write updated meta data of second meta data 2140 into non-volatile storage media 1400.

In an embodiment, the flush operation may be performed during an idle time of the SSD 1000 or computer system 2000. For example, the flush operation may be performed periodically during idle time of the SSD 1000 or the computer system 2000.

Figure 18:
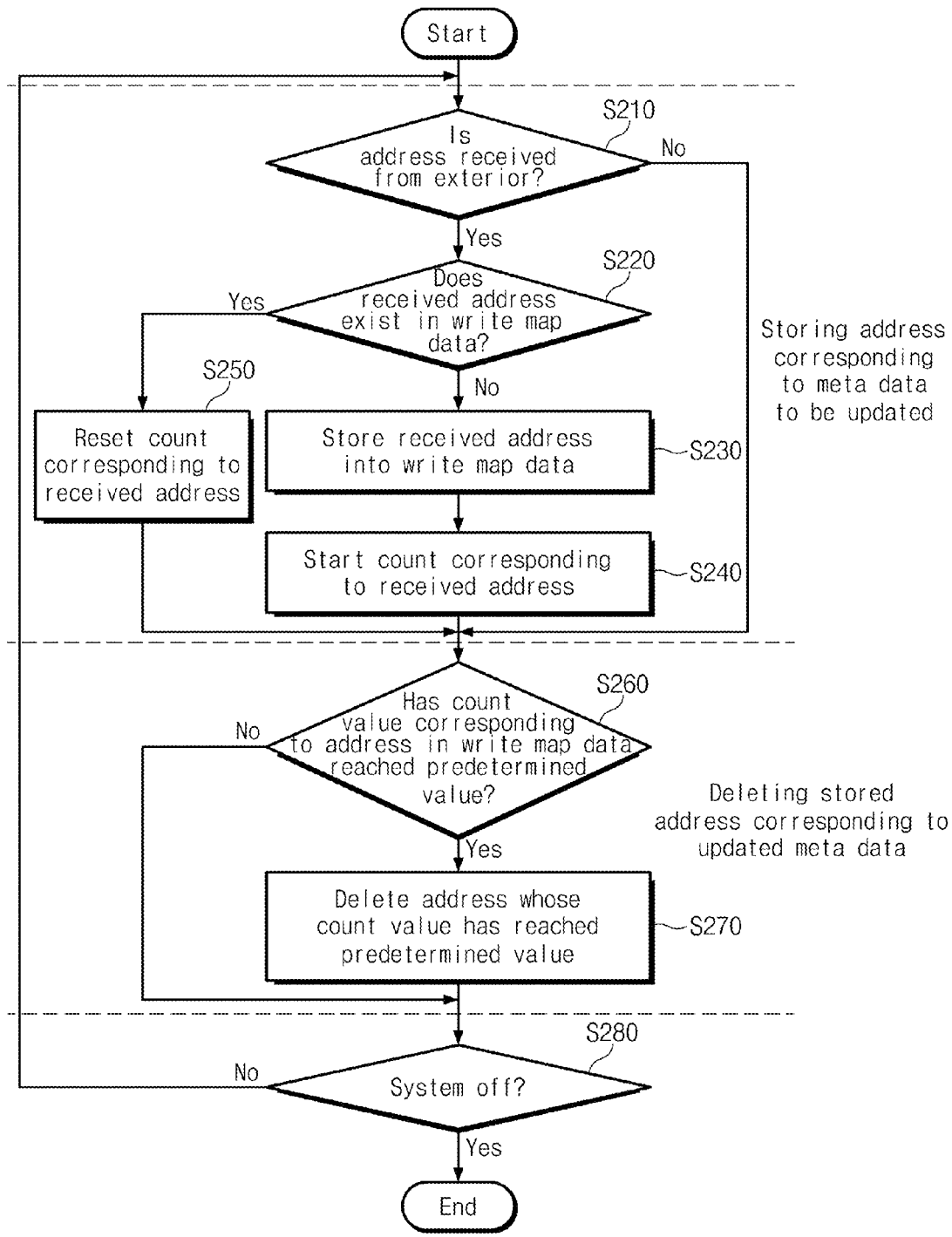
FIG. 18 is a flow chart illustrating the operation of storing the received addresses of the step S236 shown in FIG. 17.

FIG. 18 is a flow chart illustrating the operation of storing the received addresses of step S136 shown in FIG. 17. Referring to FIGS. 16 and 18, FTL 1251 determines whether address(es) are received from the source external to the memory system in a step S210. For example, FTL 1251 may determine whether the address(es) corresponding to a write request are received. When the address(es) are received from the source external to the memory system, a step S220 is performed. When the address(es) are not received from the source external to the memory system, a step S260 is performed.

In the step S220, FTL 1251 determine whether the received address(es) exist in write map data 1270. When the received address(es) exist in write map data 1270, FTL 1251 resets a count corresponding to the received address(es) in a step S250. For example, when write map data 1270 includes address(es) of the first cluster C1, and the received address (es) are address(es) of the first cluster C1, then FTL 1251 may reset the counter corresponding to the address(es) of the first cluster C1.

When the received address(es) are not in write map data 1270, FTL 1251 adds (or writes) the received address(es) into write map data 1270 in a step S230. Then, in a step S240, FTL 1251 starts a count corresponding to the received address(es). For example, when write map data 1270 does not store the address(es) of the first cluster C1, and the received address (es) are the address(es) of the first cluster C1, then FTL 1251 may add (or write) the address(es) of the first cluster C1 into write map data 1270, and start a count corresponding to the address(es) of the first cluster C1.

In the step S260, FTL 1251 determines whether a count value corresponding to the address(es) stored in write map data 1270 has reached a predetermined value. When the count value corresponding to the address(es) stored in the write map data 1270 has not reached the predetermined value, a step S280 is performed. When the count value corresponding to the addresses stored in the write map data 1270 has reached the predetermined value, a step S270 is performed.

In the step S270, FTL 1251 deletes from write map data 1270 address(es) whose count value has reached the predetermined value.

In the step S280, when SSD 1000 becomes off, FTL 1251 ends operations. When SSD 1000 remains on, FTL 1251 returns to step S210.

In summary, when address(es) are received corresponding to a write request, FTL 1251 adds (or writes) the received address(es) into the write map data 1270 and starts a count. The received address(es) are maintained in write map data 1270 until the count value reaches the predetermined value.

In an embodiment, the predetermined value may be equal to or longer than the flush time of file system 2140. That is, FTL 1251 maintains the received addresses in write map data 1270 until at least the flush time passes after the reception of the addresses. It would be understood that FTL 1251 maintains addresses corresponding to meta data to be updated of first meta data 1440 in write map data 1270 during at least the flush time (the steps S210 to S240).

When additional write request is not received until at least the flush time passes, the FTL 1251 deletes the addresses stored in the write map data 1270. That is, it would be understood that the FTL 1251 deletes addresses corresponding to meta data, of which update is completed, of the first meta data 1440 stored in the non-volatile storage media 1400 (the steps S260 and S270).

Figure 19:
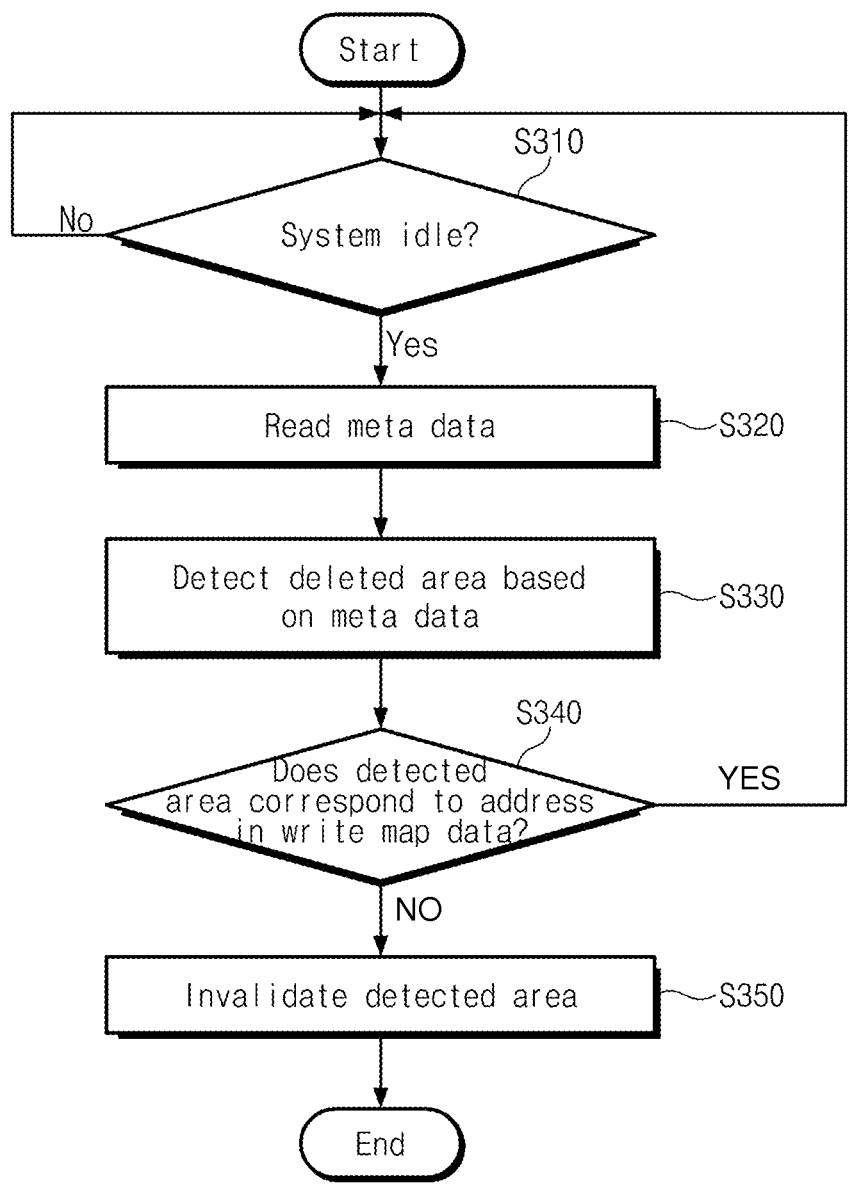
FIG. 19 is a flow chart illustrating an operation invalidating storage areas of the non-volatile storage media of the steps S137 and S138 shown in FIG. 17.

FIG. 19 is a flow chart illustrating the operation invalidating storage areas of the non-volatile storage media 1400 of the steps S137 and S138 shown in FIG. 17. Referring to FIGS. 16 and 19, FTL 1251 determines whether SSD 1000 (see FIG. 1) is in an idle state in a step S310. When SSD 1000 is in an idle state, a step S320 is performed.

In the step S320, FTL 1251 reads first meta data 1440 from non-volatile storage media 1400.

In a step S330, FTL 1251 detects deleted storage areas based on read first meta data 1440. For example, FTL 1251 may detect storage areas defined as invalid or deleted by first meta data 1440 from the read first meta data 1440.

In a step 340, FTL 1251 determines whether the detected storage areas correspond to addresses stored in write map data 1270. When the detected storage areas do not correspond to the addresses stored in write map data 1270, FTL 1251 deletes (or invalidates) the detected storage areas. When the detected storage areas correspond to the addresses stored in write map data 1270, deletion (or invalidation) of the detected storage areas is inhibited.

As described above referring to FIGS. 18 and 19, deletion (or invalidation) of storage areas, in which data is written, is inhibited until at least the flush time passes after the writing of the data. Thus, malfunctions due to differences between first and second meta data 1440 and 2140 are prevented.

In an embodiment, operations described referring to FIG. 11 may be performed periodically during an idle time of SSD 1000.

In an embodiment, the count value (e.g., C1-cnt shown in FIG. 16) corresponding to the addresses (e.g., addresses of the first cluster C1) stored in the write map data 1270 may be counted up or down when the SSD 1000 is in an idle state during operations described referring to FIG. 10.

Figure 20:
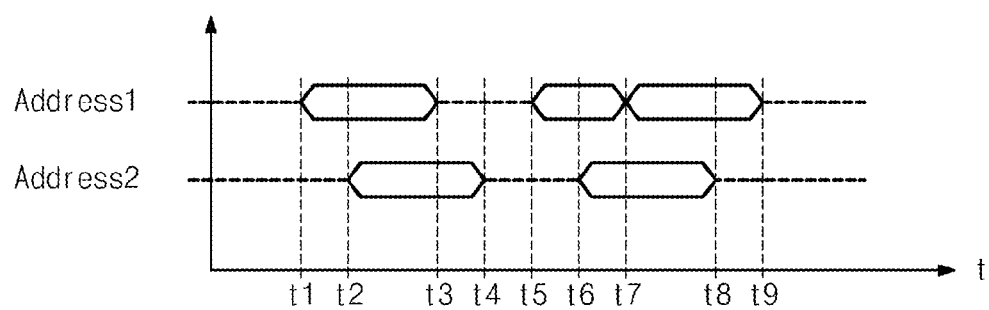
FIG. 20 is a timing diagram for describing operations of the SSD shown in FIG. 16.

FIG. 20 is a timing diagram for describing operations of SSD 1000 shown in FIG. 16. Referring to FIGS. 16 and 20, it is assumed that a write request for a first address, Address1, is received from file system 2130 at the first time t1. FTL 1251 may add (or write) the received first address into the write map data 1270. It is assumed that a write request for a second address, Address2, is received from file system 1230 at second time t2. FTL 1251 may add (or write) the received second address into write map data 1270.

It is assumed that a count value corresponding to the first address reaches the predetermined value (e.g., the flush time) at third time t3. FTL may delete the first address from write map data 1270. It is assumed that a count value corresponding to the second address reaches the predetermined value (e.g., the flush time) at fourth time t4. FTL 1251 may delete the second address from the write map data 1270.

It is assumed that a write request for the first address, Address1, is additionally received from file system 2130 at fifth time t5. FTL 1251 may add (or write) the first address into write map data 1270. It is assumed that a write request for the second address, Address2, is further received from file system 2130 at sixth time t6. FTL 1251 may add (or write) the second address into write map data 1270.

It is assumed that a write request for the first address, Address1, is further received from file system 2130 at seventh time t7. FTL 1251 may reset the count value corresponding to the first address stored in write map data 1270.

It is assumed that the count value corresponding to the second address reaches the predetermined value (e.g., the flush time) at eighth time t8. FTL 1251 may delete the second address from write map data 1270. It is assumed that the count value corresponding to the first address reaches the predetermined value (e.g., the flush time) at ninth time t9. FTL 1251 may delete the first address from write map data 1270.

FTL 1251 may invalidate (or delete) storage areas of non-volatile storage media 1400 based on first meta data 1440 read from the non-volatile storage media 1400 during the fourth to fifth time t4 to t5 and after the ninth time t9.

FTL 1251 may invalidate (or delete) storage areas of non-volatile storage media 1400 based on first meta data 1440 read from non-volatile storage media 1400, but inhibit invalidation (or deletion) of storage areas corresponding to the first address during the first to second time t1 to t2, the fifth to sixth time t5 to t6 and the eighth to ninth time t8 to t9.

FTL 1251 may invalidate (or delete) storage areas of non-volatile storage media 1400 based on first meta data 1440 read from non-volatile storage media 1400, but inhibit invalidation (or deletion) of storage areas corresponding to the second address during the third to fourth time t3 to t4.

FTL 1251 may invalidate (or delete) storage areas of non-volatile storage media 1400 based on first meta data 1440 read from non-volatile storage media 1400, but inhibit invalidation (or deletion) of storage areas corresponding to the first and second addresses during the second to third time t2 to t3 and the sixth to eighth time t6 to t8.

Figure 21:
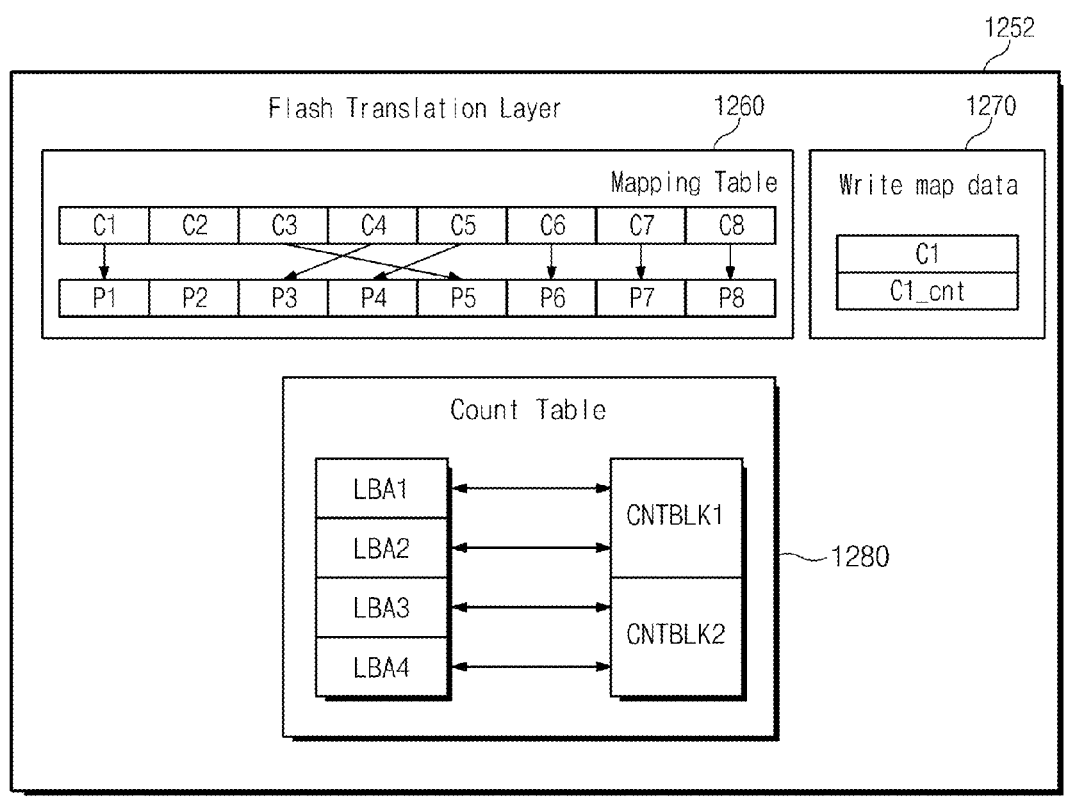
FIG. 21 is a block diagram illustrating another example of the FTL shown in FIG. 16.

FIG. 21 is a block diagram illustrating another example of an FTL 1252, which may be substituted for FTL 1251 in the arrangement shown in FIG. 16. Compared with FTL 1251 shown in FIG. 16, the FTL 1252 further includes a count table 1280. Count table 1280 includes mapping information between groups of logical addresses LBA and count blocks CNTBLK.

In an embodiment, first and second logical addresses LBA1 and LBA2 are mapped with first count block CNTBLK1, and third and fourth logical addresses LBA3 and LBA4 are mapped with second count block CNTBLK2.

When a write request for the first logical address LBA1 or the second logical address LBA2 is received from file system 2130, FTL 1252 may add (or write) the first count block CNTBLK1 into write map data 1270 and start a count corresponding to the first count block CNTBLK1. Then, FTL 1252 may reset the count value corresponding to the first count block CNTBLK1 when an additional write request for the first logical address LBA1 or the second logical address LBA2 is received before at least the flush time passes.

When FTL 1252 invalidates (or deletes) storage areas of non-volatile storage media 1400 based on first meta data 1440 read from non-volatile storage media 1400, invalidation (or deletion) for storage areas corresponding to the count block stored in write map data 1270 (e.g., LBA1 and LBA2) is inhibited. That is, FTL 1252 may divide the logical addresses LBA into a plurality of groups, and inhibit invalidation (or deletion) of storage areas on the basis of the divided groups.

Figure 22:
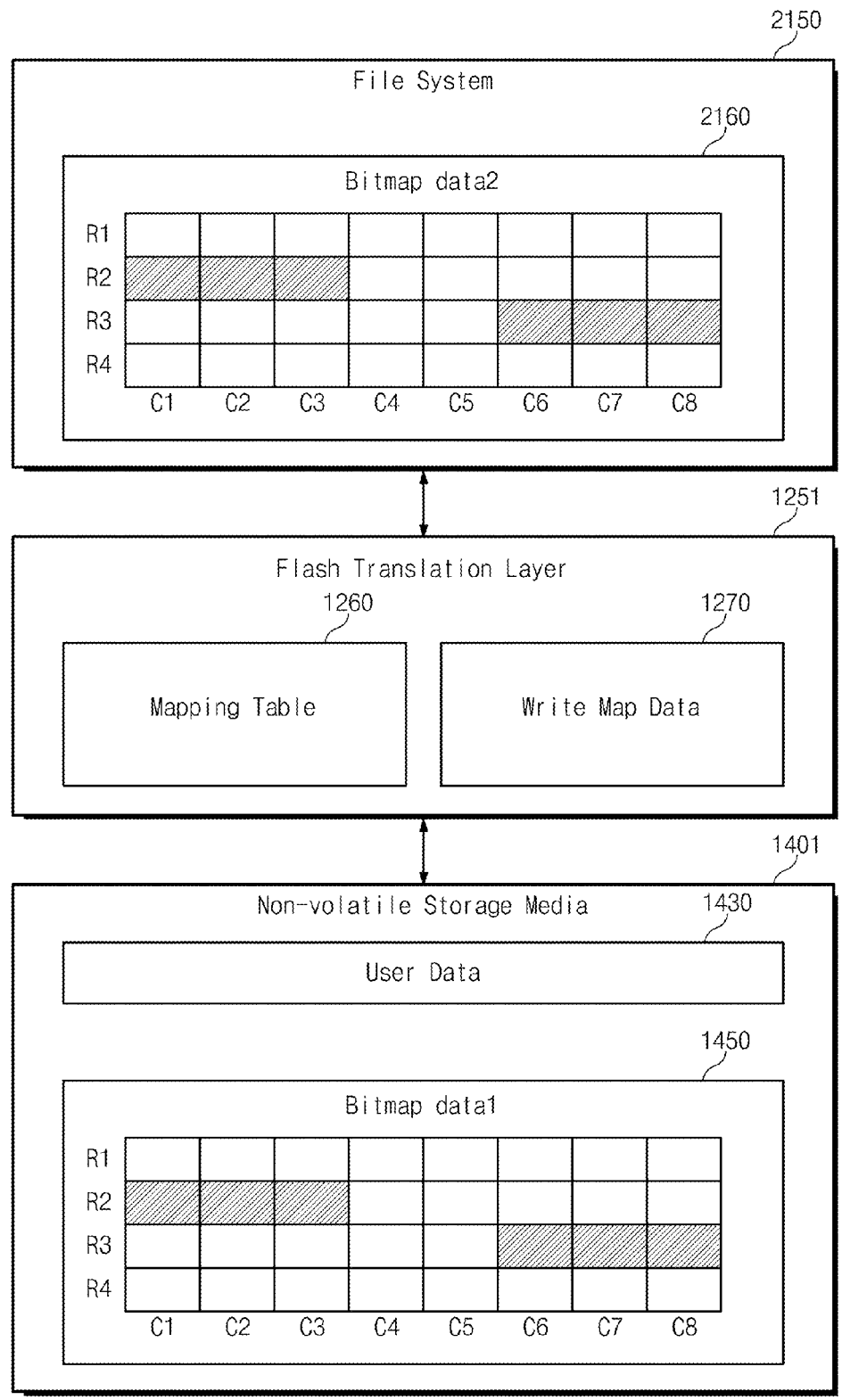
FIG. 22 is a block diagram illustrating another example embodiment of a file system, an FTL and a non-volatile storage media.

FIG. 22 is a block diagram illustrating another example embodiment of a file system 2150, FTL 1251, and non-volatile storage media 1401. Referring to FIG. 22, non-volatile storage media 1401 includes user data 1430 and a first bitmap data 1450. For example, first bitmap data 1450 may be a portion of first meta data 1440 described above with reference to FIGS. 1 to 21. First bitmap data 1450 includes information of valid storage areas and invalid storage areas of non-volatile storage media 1401. For example, boxes filled with oblique lines in FIG. 22 indicate invalid storage areas, and blank boxes indicate valid storage areas.

For convenience of description, first bitmap data 1450 is drawn as a matrix with first to fourth rows R1 to R4 and first to eighth columns C1 to C8. However, first bitmap data 1450 is not limited to having a matrix structure. For example, first bitmap data 1450 may include a set of plurality of bits. According to the sequence of the plurality of bits, storage areas of non-volatile storage media 1401 may be distinguished. According to a logic value of each bit, a corresponding storage area may be determined as being valid or invalid.

FTL 1251 includes mapping table 1260 and write map data 1270. FTL 1251 may operate as described above with reference to FIGS. 16 to 20.

File system 2150 is configured to store second bitmap data 2160. As described above with reference to FIGS. 1 to 20, file system 2150 may read first bitmap data 1450 and store the read first bitmap data 1450 as the second bitmap data 2160.

As described above with reference to FIGS. 1 to 20, file system 2150 may update second bitmap data 2160 when data are written into non-volatile storage media 1401. The updated second bitmap data 2160 may be written into non-volatile storage media 1401 after the flush time passes. That is, first bitmap data 1450 stored in non-volatile storage media 1401 may be updated after the flush time upon writing of data into non-volatile storage media 1401.

FTL 1251 may add (or write) addresses corresponding to write requests into write map data 1270. When SSD 1000 is in an idle state, FTL may read first bitmap data 1450 from non-volatile storage media 1401. Based on the read first bitmap data 1450 and write map data 1270, FTL 1251 may invalidate (or delete) storage areas of non-volatile storage media 1401. FTL 1251 may operate as described above with reference to FIGS. 13 to 21, except that first meta data 1440 is replaced with first bitmap data 1450. Thus, a detailed description is omitted.

As an example, FTL 1251 may further comprise count table 1280 as described above with reference to FIG. 21.

Figure 23:
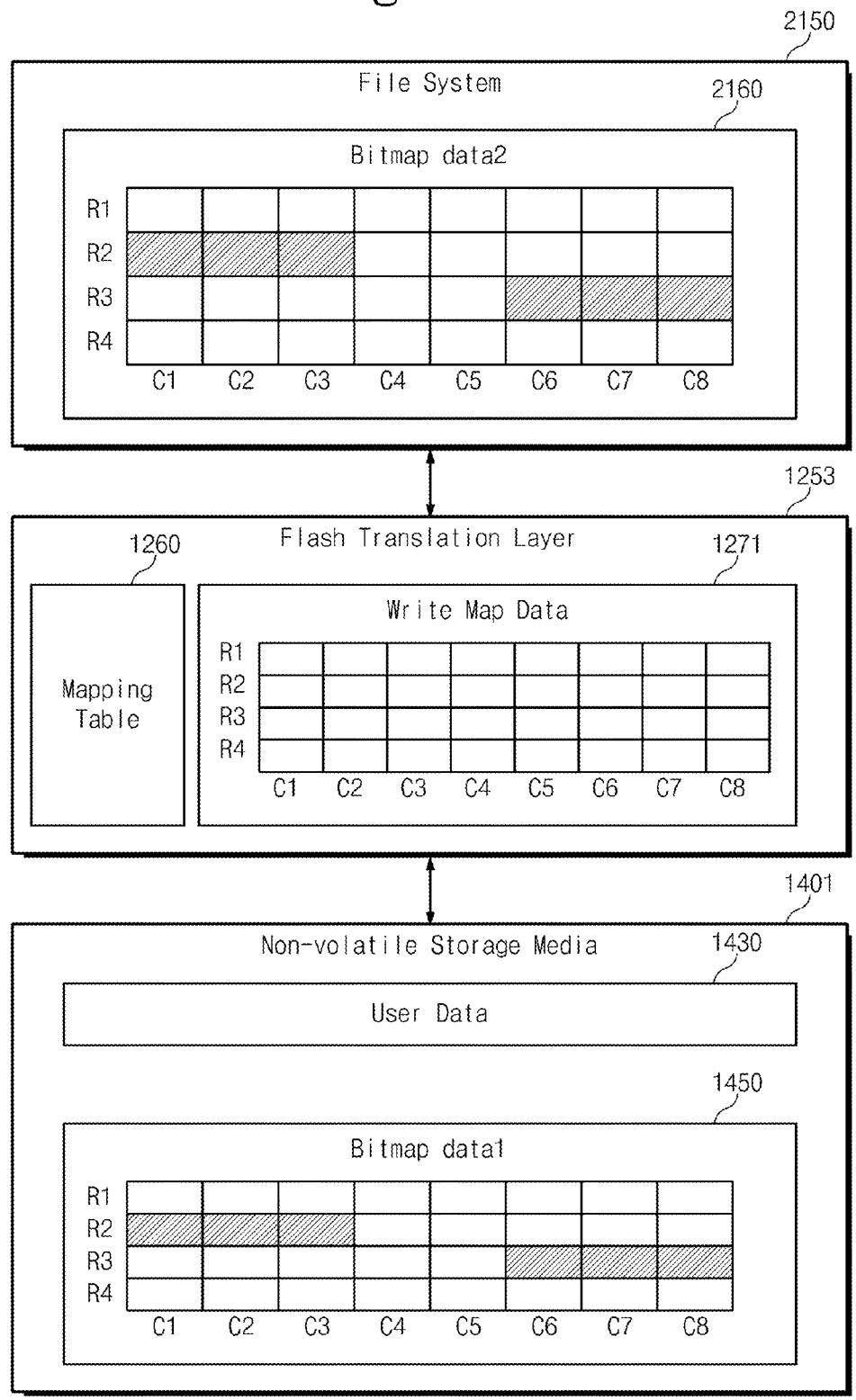
FIG. 23 is a block diagram illustrating yet another example embodiment of a file system, an FTL and a non-volatile storage media.

FIG. 23 is a block diagram illustrating yet another example embodiment of a file system 2150, FTL 1253, and non-volatile storage media 1401. Referring to FIG. 23, non-volatile storage media 1401 and file system 2150 may operate as described above with reference to FIG. 22.

FTL 1253 includes mapping table 1260 and write map data 1271. Write map data 1260 may have a structure identical to first bitmap data 1450 stored in non-volatile storage media 1401. For example, write map data 1271 may have a matrix structure including first to fourth rows R1 to R4 and first to eighth columns C1 to C8.

File system 2150, FTL 1253 and non-volatile storage media 1401 may operate as described above with reference to FIG. 17. For example, when file system 2150 writes data into non-volatile storage media 1401, FTL 1253 adds (or writes) addresses of storage areas, in which data are written, into write map data 1271. When SSD 1000 is in an idle state, FTL 1253 may read first bitmap data 1450 from non-volatile storage media 1401 and invalidate (or delete) storage areas of the non-volatile storage media 1401 based on read first bitmap data 1450 and the addresses stored in write map data 1271.

Hereinafter, when a specific box of first bitmap data 1450 and/or second bitmap data 2160 in FIG. 23 is filled with oblique lines, it is assumed that the specific box indicates invalid storage areas. The specific box filled with oblique lines is referred as being in a reset state. When a specific box of first bitmap data 1450 and/or second bitmap data 2160 is blank, it is assumed that the specific box indicates valid storage areas. The specific blank box is referred as being in a set state.

Furthermore, when a specific box of write map data 1271 is in a set state, it is assumed that the specific box indicates that meta data corresponding to the specific box of first meta data 1450 are to be updated. When a specific box of write map data 1271 is in a reset state, it is assumed that meta data corresponding to the specific box of first meta data 1450 are updated completely.

For example, it is assumed that a box of write map data 1253, first bit map data 1450 and/or second bitmap data 2160 corresponds to a bit. That is, it is assumed that write map data 1253, first bit map data 1450 and/or second bitmap data 2160 may be configured to include 32 bits each.

Figure 24:
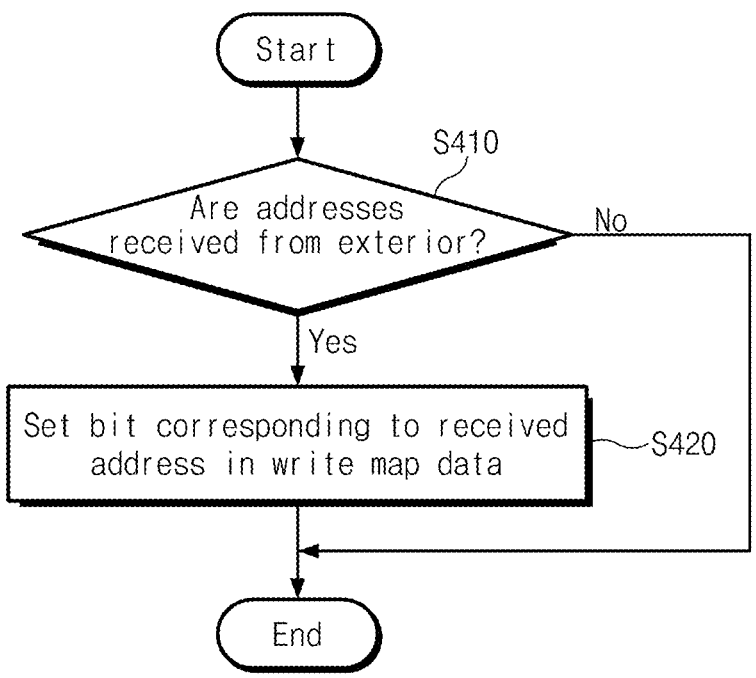
FIG. 24 is a flow chart illustrating a method for storing addresses by the FTL.

FIG. 24 is a flow chart illustrating a method for storing addresses by FTL 1253. Referring to FIGS. 23 and 24, FTL 1253 determines whether addresses are received from the source external to the memory system in a step S410. For example, FTL 1253 may determine whether a write command and addresses corresponding to the write command are received. When addresses are received from the source external to the memory system, a step S420 is performed.

In a step S520, FTL 1253 sets bits of write map data 1271 corresponding to the received addresses. That is, when the write command and the addresses are received from file system 2150, FTL 1253 may set write map data 1271 to indicate that meta data corresponding to the received addresses of the first meta data 1450 are to be updated.

Figure 25:
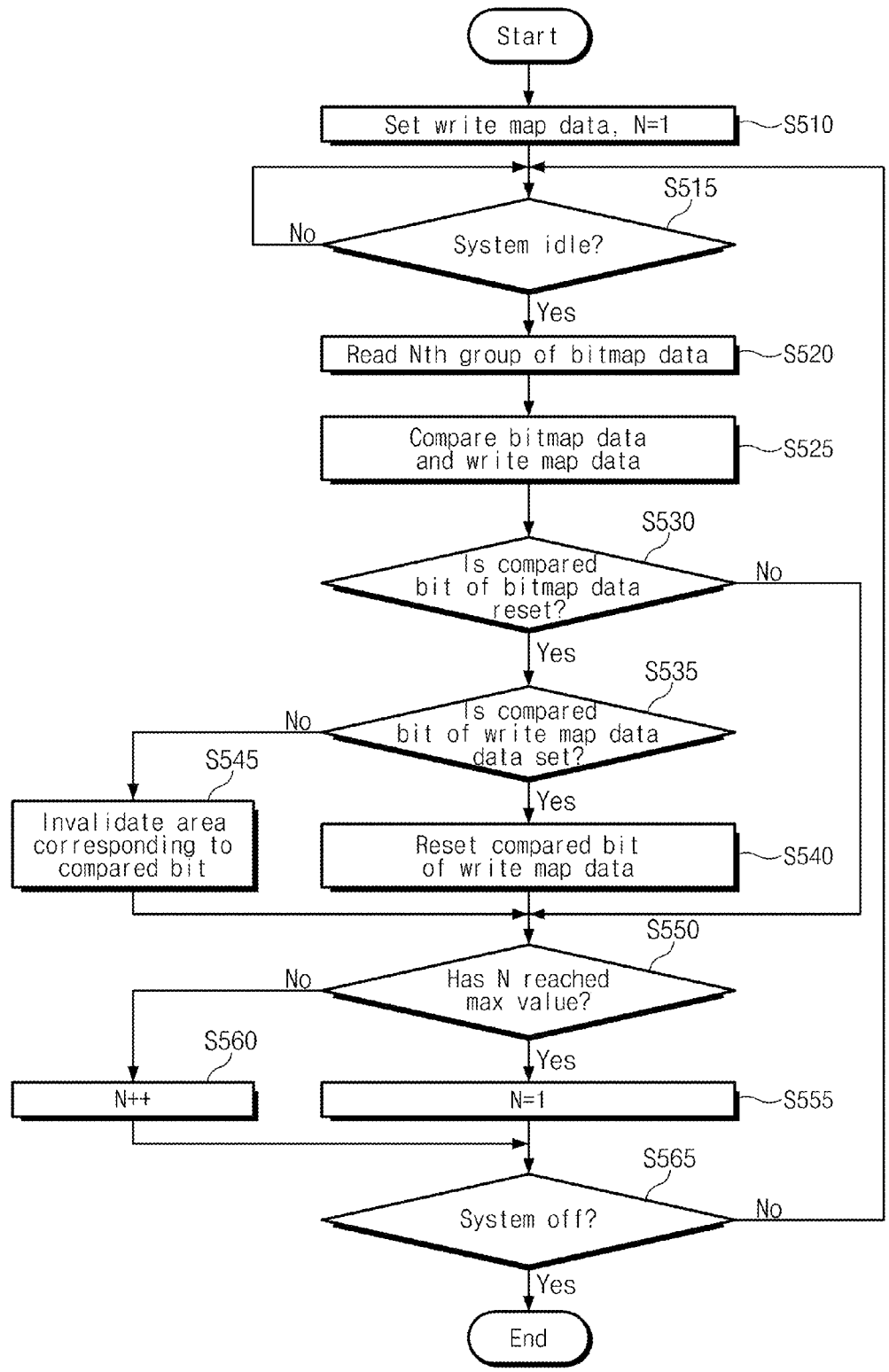
FIG. 25 is a flow chart illustrating a method for invalidating (or deleting) storage areas of a non-volatile storage media based on read first meta data from the non-volatile storage media and write map data by the FTL.

FIG. 25 is a flow chart illustrating a method for invalidating (or deleting) storage areas of non-volatile storage media 1401 based on read first meta data 1450 from non-volatile storage media 1401 and write map data 1271 by FTL 1253. Referring to FIGS. 23 and 25, an initialization operation is performed in a step S510. For example, FTL 1253 may sets all bits of write map data 1271. That is, FTL 1253 adjusts write map data 1271 to indicate that all first meta data 1450 are to be updated. Then, FTL 1253 may set a group variable N to be 1.

In a step S515, FTL 1253 determines whether SSD 1000 (shown in FIG. 1) is in an idle state. When SSD 1000 is in an idle state, a step S520 is performed.

In the step S520, FTL 1253 reads the Nth group of first bitmap data 1450 stored in non-volatile storage media 1401. For example, FTL 1253 may divide first bitmap data 1450 into M groups (M is a positive integer). Then, FTL 1253 may read the Nth group of the divided M groups.

In an example, it is assumed that FTL 1253 divides, first bitmap data 1401 on a basis of rows. That is, FTL 1253 may divides the first bitmap data 1450 into first to fourth groups corresponding to first to fourth rows R1 to R4, respectively.

FTL 1253 may divide write map data 1271 identically to first bitmap data 1450. For example, when first bitmap data 1450 is divided on the basis of rows, write map data 1271 is also divided on a basis of rows. Divided groups of write map data 1271 may correspond to divided groups of the first bitmap data 1450, respectively. For example, the i-th group of write map data 1271 may correspond to the i-th group of first bitmap data 1450.

In a step S525, FTL 1253 compares read first bitmap data 1450 and write map data 1271. For example, FTL 1253 may compare the Nth group of read first bitmap data 1450 and the Nth group of write map data 1271. For example, FTL 1253 may compare bits of the Nth group of the bitmap data 1450 and write map data 1271 sequentially.

In a step S530, FTL 1253 determines whether the compared bit of the read first bitmap data 1450 is in a reset state. When the compared bit of read first bitmap data 1450 is in a reset state, that is, when the compared bit of read first bitmap data 1450 indicates an invalid storage area, a step S535 is performed. When the compared bit of read first bitmap data 1450 is in a set state, that is, when the compared bit of read first bitmap data 1450 indicates a valid storage area, a step S550 is performed.

In the step S535, FTL 1253 determines whether the compared bit of write map data 1271 is in a set state. When the compared bit of write map data 1271 is in a set state, that is, when the compared bit of write map data 1271 indicates that meta data corresponding to the compared bit are to be updated, FTL 1253 resets the compared bit of the write map data 1271 in a step S540. Then the step S550 is performed.

When the compared bit of write map data 1271 is not in a set state, that is, when the compared bit of write map data 1271 indicates that meta data corresponding to the compared bit are updated completely, FTL 1271 invalidates (or deletes) a storage area corresponding to the compared bit of write map data 1271 of non-volatile storage media 1450 in the step S545. Then, the step S550 is performed.

In an example, the steps S530 to S545 are performed to bits of the Nth group of write map data 1450 and read first bitmap data 1271, respectively.

In the step S550, FTL 1253 determines whether the group variable N has reached a max value (e.g., M). When read first bitmap data 1450 and write map data 1271 are divided into 4 groups respectively, the max value M may be 4. When the group variable N reaches the max value, FTL 1253 initiates the group variable as 1 in a step S555. When the group variable has not reached the max value, FTL 1253 increments the group variable N by one in a step S560.

In a step S565, when the SSD 1000 is not off, the step S515 is performed, again.

As described above with reference to FIGS. 23 to 25, when FTL 1253 writes data into non-volatile storage media 1401, FTL 1253 sets a bit of write map data 1271 corresponding to a storage area in which data are written. That is, write map data 1271 is updated to indicate that meta data corresponding to the storage area in which data are written of first meta data 1450 are to be updated.

When SSD 1000 is in an idle state, FTL 1253 compares the first bitmap data 1450 stored in the non-volatile storage media 1401 and write map data 1271. For example, FTL 1253 may compare first bitmap data 1450 and write map data 1271 on the basis of a specific group.

When the compared bit of first bitmap data 1450 indicates a valid storage area, that is, when the compared bit of first bitmap data 1450 is in a set state, FTL 1253 completes the comparison operation. Thus, invalidation (or deletion) of a valid storage area is inhibited. When the compared bit of first bitmap data 1450 indicates an invalid storage area, that is, when the compared bit of first bitmap data 1450 is in a reset state, FTL 1253 determines whether to invalidate (or delete) the storage area corresponding to the compared bitmap data of non-volatile storage media 1401 according to the compared bit of write map data 1271.

When the compared bit of write map data 1271 is in a set state, that is, when meta data corresponding to the compared bit of write map data 1271 is to be updated, FTL 1253 sets the compared bit of write map data 1271 and postpones invalidation (or deletion) of the storage area of non-volatile storage media 1401 corresponding to the compared bit. Thus, invalidation (or deletion) of the storage area corresponding to meta data to be updated is postponed, and write map data 1271 is updated to indicate that meta data corresponding to the compared bit of the write map data 1271 is updated completely. Then, FTL 1253 completes the comparison operation.

When the compared bit of write map data 1271 is in a reset state, that is, when meta data corresponding to the compared bit of write map data 1271 is updated completely, FTL 1253 invalidates (or deletes) the storage area of non-volatile storage media 1401 corresponding to the compared write map data. Thus, the storage area, which is invalidated by file system 2150, corresponding to meta data updated completely is invalidated (or deleted) by FTL 1253.

During the initialization operation (the step S510), write map data 1270 is totally set. When the compared bitmap data is in a set state, FTL 1253 maintains the compared write map data as a set state. When the compared bitmap data is in a reset state, FTL 1253 resets the compared write map data. Thus, write map data 1271 is adjusted to be identical to first bitmap data 1450 during the comparison operation.

Figure 26:
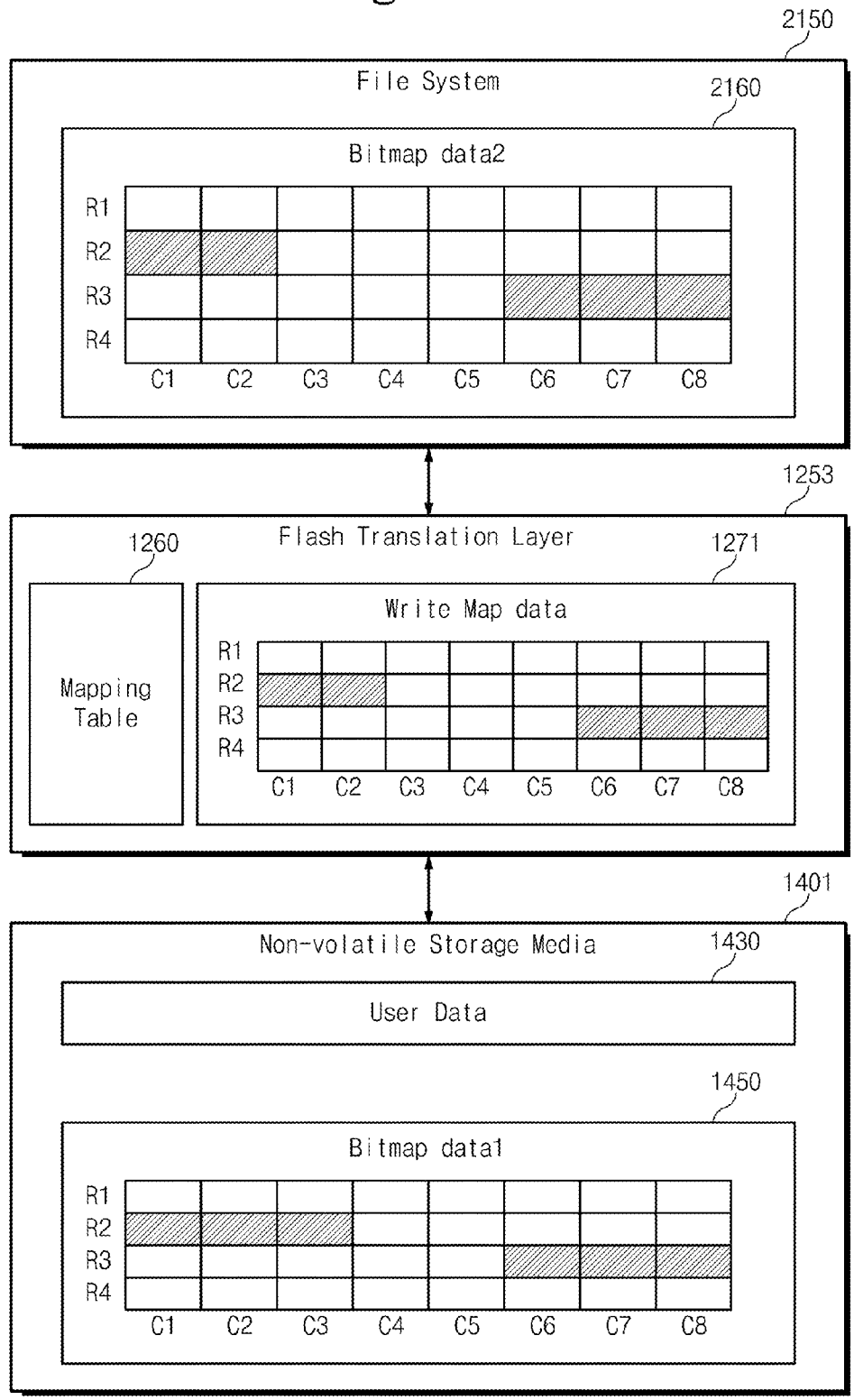
FIG. 26 and FIG. 27 are block diagrams illustrating a file system, an FTL and a non-volatile storage media when data are written into the non-volatile storage media.
Figure 27:
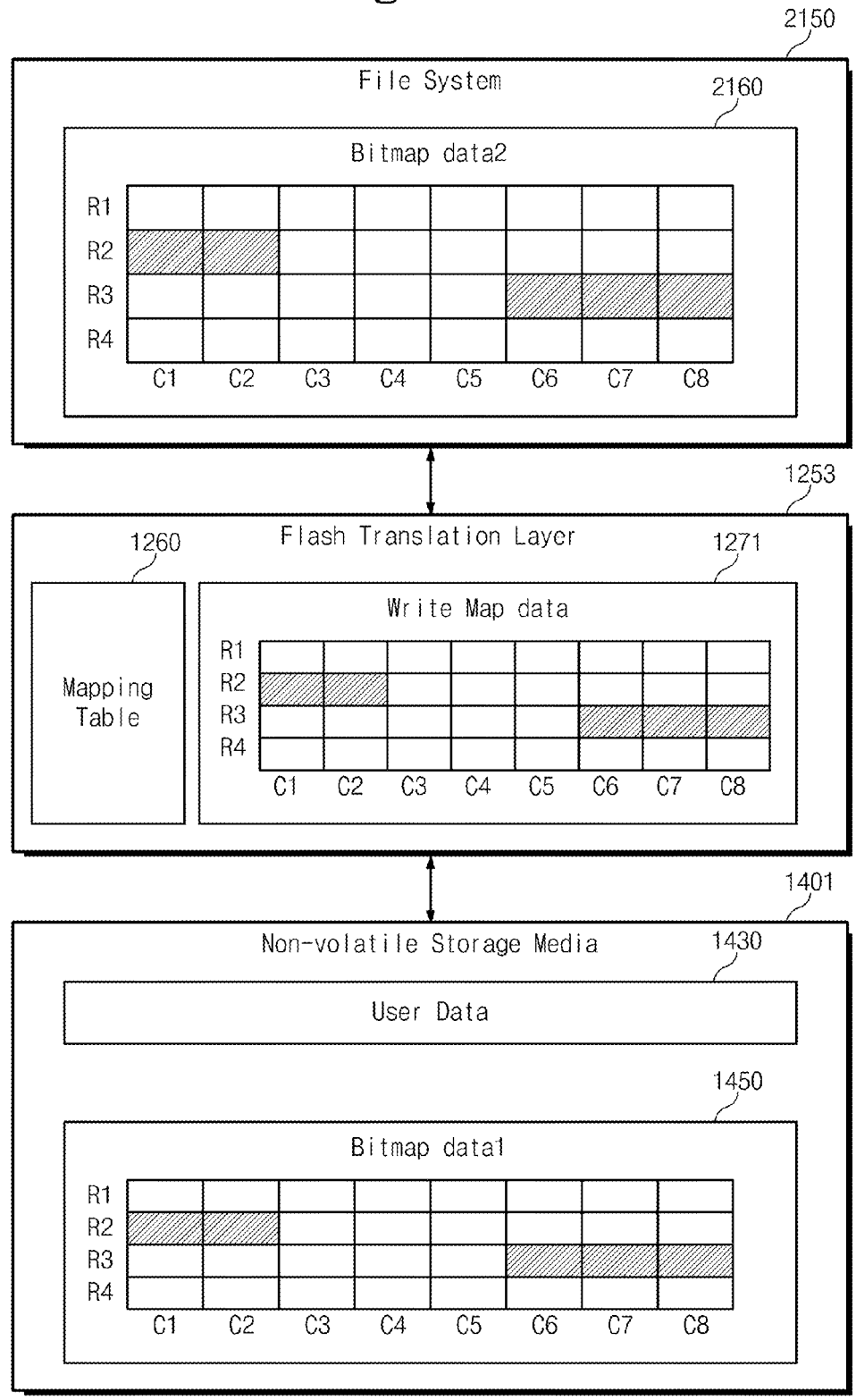

FIG. 26 and FIG. 27 are block diagrams illustrating file system 2150, FTL 1253 and non-volatile storage media 1401 when data are written into non-volatile storage media 1401. In an example, file system 2150 writes data into a storage area corresponding to a box of a second row R2 and a third column C3 in second bitmap data 2160. Thus, the box of second row R2 and the third column C3 in the write map data 1271 is in a set state. In this example, it is assumed that the second bitmap data 2160 is not flushed yet. That is, a box of a second row R2 and a third column C3 in first bitmap data 1450 indicates an invalid storage area.

At this time, it is assumed that FTL 1253 compares first bitmap data 1450 with write map data 1271.

The box of the second row R2 and the third column C3 in write map data 1271 indicates that corresponding meta data are to be updated.

The box of the second row R2 and the third column C3 of first bitmap data 1450 is in a reset state because the flush operation has not been performed yet.

When FTL 1253 compares write map data 1271 and first bitmap data 1450, FTL 1253 may reset the box of the second row R2 and the third column C3 in write map data 1271 because the box of the second row R2 and the third column C3 in first bitmap data 1450 is in a reset state. That is, FTL 1253 adjusts write map data 1271 to indicate that meta data corresponding to the storage area, in which data are written, are updated completely.

Then, FTL 1253 may compare the third rows R3, the fourth rows R4 and the first rows R1 of write map data 1271 and first bitmap data 1450 sequentially during an idle time of the SSD 1000. Then, FTL 1253 may compare the second rows R2 of write map data 1253 and first bitmap data 1450 again.

In an example, the total time of comparing write map data 1253 and the first bitmap data 1450 may be set to be much than or equal to the flush time.

If data are additionally written into the storage area corresponding to the box of the second row R2 and the third column C3 in write map data 1253 before the second rows R2 are compared again, the box of the second row R2 and the third column C3 in write map data 1271 may be in a set state. Thus, invalidation (or deletion) of the storage area corresponding to the box of the second row R2 and the third column C3 in write map data 1271 is postponed again. Then FTL 1253 may reset the box of the second row R2 and the third column C3 in write map data 1271 again.

If data are not additionally written into the storage area corresponding to the box of the second row R2 and the third column C3 in write map data 1271 before the second rows R2 are compared again, the box of the second row R2 and the third column C3 in write map data 1271 may maintain a reset state when the second rows R2 are compared again. Meta data corresponding to the box of the second row R2 and the third column C3 in second bitmap data 2160 may have been flushed into first bitmap data 1450 because a time period greater than or equal to the flush time have passed after the writing operation. Thus, the box of the second row R2 and the third column C3 in first bitmap data 1450 indicates a valid storage area as shown in FIG. 27. That is, invalidation (or deletion) may be inhibited when the second rows R2 of write map data 1271 and first bitmap data 1450 are compared again.

As an example, when a box of the first bit map data 1450 is in a valid state and corresponding box of write map data 1271 is in an invalid state, FTL 1253 can validate the corresponding box of write map data 1271 as shown in FIG. 27.

As described above, when specific data of first bitmap data 1450 is in a reset state and specific data of write map data 1271 is in a set state, that is, when data are written into a storage area corresponding to the specific write map data, FTL 1253 postponed invalidation (or deletion) of the storage area during the specific time that is greater than or equal to the flush time. Thus, malfunctions due to discordance of the first bitmap data 1450 and the write map data 1271 are avoided.

As described above, storage areas of the non-volatile storage media 1400 or 1401 are invalidated (or deleted) based on meta data 1440 (or first bitmap data 1450) stored in the non-volatile storage media 1400 or 1401, invalidation (or deletion) of storage areas corresponding to write addresses are inhibited until a time period greater than or equal to the flush time passes. Thus, the reliability of SSD 1000, which communicates with a flush-based host, is improved.

Figure 28:
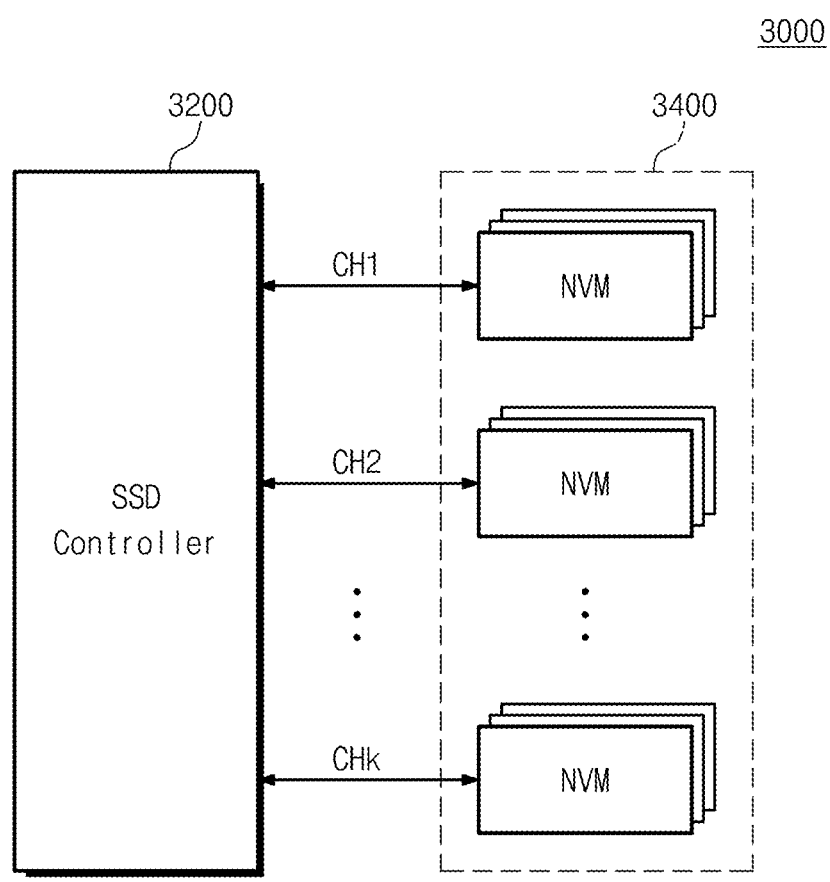
FIG. 28 is a block diagram illustrating another embodiment of an SSD.

FIG. 28 is a block diagram illustrating another embodiment of an SSD 3000. Referring to FIG. 28, SSD 3000 comprises an SSD controller 3200 and a non-volatile storage media 3400. SSD controller 3200 is configured to operate as described above with reference to FIGS. 1 to 27.

Non-volatile storage media 3400 includes a plurality of NVMs. The NVMs are divided into a plurality of groups of NVMs. Each group of NVMs is configured to communicate with SSD controller 3200 through a common channel. In FIG. 28, it is illustrated that the NVMs communicate with SSD controller 3200 through first to k-th channels. Meta data 1440 (or the first bitmap data 1450) described above with reference to FIGS. 16 to 27 are stored in at least one of the plurality of NVMs. SSD controller 3200 may read meta data 1440 (or first bitmap data 1450), and invalidate storage areas of non-volatile storage media 3400 based on the read meta data 1440 (or the read first bitmap data 1450) and write map data 1270 or 1271. Thus, the reliability of SSD 3000 can be improved.

In an example, SSD 3000 can replace SSD 1000 shown in FIG. 12, and form computer system 2000.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operating a memory system including a non-volatile storage media, the method comprising:
   reading meta data corresponding to the non-volatile storage media from the non-volatile storage media;
   detecting meta data to be updated from the read meta data; and
   invalidating storage areas of the non-volatile storage media based on the read meta data and the detected meta data to be updated.

2. The method of claim 1, wherein detecting the meta data to be updated from the read meta data includes detecting meta data corresponding to second storage areas of the non-volatile storage media for which a specific time period has not yet passed since the second storage areas were last accessed.

3. The method of claim 2, wherein the specific time period corresponds to a flush time of a host that is operatively connected to the memory system.

4. The method of claim 1, wherein invalidating the storage areas of the non-volatile storage media includes
   detecting storage areas from the read meta data which are set as invalid by the read meta data; and
   invalidating the detected storage areas, except for second storage areas corresponding to the detected meta data to be updated.

5. The method of claim 1, wherein the invalidating the storage areas of the non-volatile storage media includes deleting the storage areas of the non-volatile storage media based on the read meta data and the detected meta data to be updated.

6. A memory system comprising:
   a non-volatile storage media; and
   a controller configured to control the non-volatile storage media,
   wherein the controller is configured to read meta data corresponding to the non-volatile storage media from the non-volatile storage media, and to invalidate storage areas of the non-volatile storage media based on the read meta data and addresses received from a source external to the memory system.

7. The memory system of claim 6, wherein the controller is further configured to delete the storage areas of the non-volatile storage media based on the read meta data and the received addresses.

8. The memory system of claim 6, wherein the controller is further configured to invalidate the storage areas of the non-volatile storage media based on the read meta data and the received addresses when the received addresses correspond to a write command.

9. The memory system of claim 6, wherein the controller is further configured to detect from the read meta data storage areas of the non-volatile storage media which are set as invalid by the read meta data, and to invalidate the detected storage areas, except for second storage areas corresponding to the received addresses for which a specific time period has not yet passed since the addresses were received.

10. The memory system of claim 6, wherein the controller is further configured to detect from the read meta data storage areas of the non-volatile storage media which are set as invalid by the read meta data, and to invalidate the detected storage areas while inhibiting invalidation of second storage areas corresponding to the received addresses.

11. The memory system of claim 6, wherein the controller is further configured to store the received addresses into a memory, to start a count corresponding to the stored addresses, and to invalidate the storage areas of the non-volatile storage media based on the read meta data and the addresses stored in the memory.

12. The memory system of claim 11, wherein the controller is further configured to delete the stored addresses from the memory when the count corresponding to the stored addresses reaches a specific value.

13. The memory system of claim 11, wherein the controller is further configured to reset the count corresponding to the stored addresses when the addresses stored in the memory are received from a source external to the memory system.

14. The memory system of claim 6, wherein the controller is further configured to read bitmap data of the meta data stored in the non-volatile storage media, and to invalidate the storage areas of the non-volatile storage media based on the read bitmap data and the received addresses, where the bitmap data indicates valid storage areas and invalid storage areas of the non-volatile storage media.

15. The memory system of claim 14, wherein the controller is further configured to store write map data having an identical structure as the bitmap data, to sequentially compare the bitmap data and the write map data, to update the write map data according to the comparison result, and to invalidate the storage areas of the non-volatile storage media based on the bitmap data and the updated write map data.

16. The memory system of claim 15, wherein the controller is further configured to reset compared data of the write map data when the compared data of the bitmap data indicates an invalid storage area and the compared data of the write map data is in a set state during the comparison operation.

17. The memory system of claim 15, wherein the controller is further configured to inhibit invalidation of storage areas of the non-volatile storage area corresponding to compared data of the bitmap data when the compared data of the write map data is in a set state during the comparison operation.

18. The memory system of claim 15, wherein the controller is further configured to set data of the write map data corresponding to the received addresses when the addresses are received.

19. The memory system of claim 6, wherein the controller and the non-volatile storage media form a Solid State Drive (SSD).

20. A computing system comprising:
a non-volatile storage media configured to store meta data;
a controller configured to control the non-volatile storage media; and
a processor configured to read the meta data stored in the non-volatile storage media and to access the non-volatile storage media based on the read meta data,
wherein the controller is further configured to read the meta data stored in the non-volatile storage media and to invalidate storage areas of the non-volatile storage media based on the read meta data, while inhibiting invalidation of second storage areas for which a specific time period has not yet passed since the processor last accessed the second storage areas.

* * * * *